(12) United States Patent
Hagenbuch

(10) Patent No.: US 8,014,917 B2
(45) Date of Patent: *Sep. 6, 2011

(54) APPARATUS FOR TRACKING AND RECORDING VITAL SIGNS AND TASK-RELATED INFORMATION OF A VEHICLE TO IDENTIFY OPERATING PATTERNS

(76) Inventor: LeRoy G. Hagenbuch, Peoria Heights, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/727,537

(22) Filed: Mar. 19, 2010

(65) Prior Publication Data

US 2010/0286865 A1 Nov. 11, 2010

Related U.S. Application Data

(60) Division of application No. 11/410,648, filed on Apr. 25, 2006, now Pat. No. 7,765,039, which is a division of application No. 10/383,822, filed on Mar. 7, 2003, now Pat. No. 7,039,507, which is a continuation of application No. 08/448,764, filed on May 24, 1995, now Pat. No. 6,546,363, which is a division of application No. 08/196,480, filed on Feb. 15, 1994, now abandoned.

(51) Int. Cl.
*G11B 5/02* (2006.01)
(52) U.S. Cl. ............ 701/29; 701/33; 701/35; 340/436
(58) Field of Classification Search .................. 701/1, 3, 701/7, 29–50; 702/173, 176; 703/1, 3, 7; 73/489; 342/357.01–357.16, 457, 458; 340/436
See application file for complete search history.

(56) References Cited

U.S. PATENT DOCUMENTS

| | | | |
|---|---|---|---|
| 3,441,858 A | 4/1969 | Graham |
| 3,461,423 A | 8/1969 | Trumble |
| 3,646,583 A | 2/1972 | Schderi |
| 3,781,824 A | 12/1973 | Caiati et al. |
| 3,828,306 A | 8/1974 | Angeloni |
| 3,965,733 A | 6/1976 | Hutchings et al. |

(Continued)

FOREIGN PATENT DOCUMENTS

DE 2552572 A 6/1977

(Continued)

OTHER PUBLICATIONS

Caterpillar® Publication No. SENR2945, "Electronic Monitoring System (EMS)", pp. 3-16.

(Continued)

*Primary Examiner* — Richard M. Camby
(74) *Attorney, Agent, or Firm* — Leydig, Voit & Mayer, Ltd.

(57) ABSTRACT

An apparatus is provided for diagnosing the state of health of a vehicle and for providing the operator of the vehicle with a substantially real-time indication of the efficiency of the vehicle in performing an assigned task with respect to a predetermined goal. A processor on-board the vehicle monitors sensors that provide information regarding the state of health of the vehicle and the amount of work the vehicle has done. In response to anomalies in the data from the sensors, the processor records information that describes events leading up to the occurrence of the anomaly for later analysis that can be used to diagnose the cause of the anomaly. The sensors are also used to prompt the operator of the vehicle to operate the vehicle at optimum efficiency.

38 Claims, 28 Drawing Sheets

U.S. PATENT DOCUMENTS

| | | |
|---|---|---|
| 4,258,421 A | 3/1981 | Juhasz et al. |
| 4,277,772 A | 7/1981 | Kastura et al. |
| 4,300,040 A | 11/1981 | Gould et al. |
| 4,340,810 A | 7/1982 | Glass |
| 4,344,136 A | 8/1982 | Panik |
| 4,369,426 A | 1/1983 | Merkel |
| 4,475,404 A | 10/1984 | Rutledge, Jr. et al. |
| 4,511,887 A | 4/1985 | Fiore |
| 4,577,182 A | 3/1986 | Millsap et al. |
| 4,614,477 A | 9/1986 | Hagenbuch |
| 4,621,858 A | 11/1986 | Hagenbuch |
| 4,627,013 A | 12/1986 | Ichiyama et al. |
| 4,630,227 A | 12/1986 | Hagenbuch |
| 4,635,739 A | 1/1987 | Foley et al. |
| 4,636,950 A | 1/1987 | Caswell et al. |
| 4,638,289 A | 1/1987 | Zottnik |
| 4,646,343 A | 2/1987 | Chen |
| 4,651,157 A | 3/1987 | Gray et al. |
| 4,658,096 A | 4/1987 | West, Jr. et al. |
| 4,677,579 A | 6/1987 | Radomilovich |
| 4,678,235 A | 7/1987 | Hagenbuch |
| 4,688,244 A | 8/1987 | Hannon et al. |
| 4,697,281 A | 9/1987 | O'Sullivan |
| 4,717,904 A | 1/1988 | Murakami |
| 4,729,102 A | 3/1988 | Miller |
| 4,737,975 A | 4/1988 | Shafer |
| 4,740,792 A | 4/1988 | Sagey et al. |
| 4,750,197 A | 6/1988 | Denekamp et al. |
| 4,754,410 A | 6/1988 | Leech et al. |
| 4,775,997 A | 10/1988 | West, Jr. et al. |
| 4,817,418 A | 4/1989 | Asami et al. |
| 4,826,233 A | 5/1989 | Hagenbuch |
| 4,831,539 A | 5/1989 | Hagenbuch |
| 4,835,719 A | 5/1989 | Sorells |
| 4,838,835 A | 6/1989 | Takano et al. |
| 4,839,835 A | 6/1989 | Hagenbuch |
| 4,839,835 A | 6/1989 | Hagenbuch |
| 4,845,648 A | 7/1989 | Hagenbuch |
| 4,866,616 A | 9/1989 | Takeuchi et al. |
| 4,897,642 A | 1/1990 | DiLullo et al. |
| 4,910,493 A | 3/1990 | Chambers et al. |
| 4,926,331 A | 5/1990 | Windle et al. |
| 4,939,652 A | 7/1990 | Steiner |
| 4,962,456 A | 10/1990 | Abe et al. |
| 4,972,457 A | 11/1990 | O'Sullivan |
| 5,023,900 A | 6/1991 | Tayloe et al. |
| 5,032,845 A | 7/1991 | Velasco |
| 5,068,656 A | 11/1991 | Sutherland |
| 5,077,670 A | 12/1991 | Takai et al. |
| 5,079,727 A | 1/1992 | Yasue et al. |
| 5,102,198 A | 4/1992 | Hagenbuch |
| 5,119,102 A | 6/1992 | Barnard |
| 5,174,632 A | 12/1992 | Hagenbuch |
| D334,158 S | 3/1993 | Hagenbuch |
| 5,220,968 A | 6/1993 | Weber |
| 5,223,844 A | 6/1993 | Mansell et al. |
| 5,224,761 A | 7/1993 | Hagenbuch |
| 5,228,750 A | 7/1993 | Hagenbuch |
| 5,236,261 A | 8/1993 | Hagenbuch |
| 5,249,843 A | 10/1993 | Hagenbuch |
| 5,280,425 A | 1/1994 | Hogge |
| D343,784 S | 2/1994 | Hagenbuch |
| 5,303,163 A | 4/1994 | Ebaugh et al. |
| 5,311,197 A | 5/1994 | Sorden et al. |
| 5,325,082 A | 6/1994 | Rodriguez |
| 5,371,487 A | 12/1994 | Hoffman et al. |
| 5,396,422 A | 3/1995 | Forchert et al. |
| 5,400,018 A | 3/1995 | Scholl et al. |
| 5,410,109 A | 4/1995 | Tarter et al. |
| 5,430,432 A * | 7/1995 | Camhi et al. ................. 340/438 |
| 5,446,659 A | 8/1995 | Yamawaki |
| 5,481,906 A | 1/1996 | Nagayoshi et al. |
| 5,485,596 A | 1/1996 | Igarashi et al. |
| 5,528,499 A | 6/1996 | Hagenbuch |
| 5,541,840 A | 7/1996 | Gurne et al. |
| 5,742,666 A | 4/1998 | Alpert |
| RE35,920 E | 10/1998 | Sorden et al. |
| 6,546,363 B1 | 4/2003 | Hagenbuch |

FOREIGN PATENT DOCUMENTS

| | | |
|---|---|---|
| EP | 0242099 A2 | 10/1987 |
| JP | 52-1829 A | 1/1997 |

OTHER PUBLICATIONS

Caterpillar® Publication Entitled "Tool Announcement", (Apr. 1987).

Caterpillar® Publication Entitled "Vehicle Monitoring System".

Caterpillar® Publication No. 2946, entitled "Because Knowledge Is Power", (1993).

Detroit Diesel Corporation Electronic Controls DDEC—Brochure No. 7SE 414, Canton, Ohio.

Allison Transmission—Brochure No. SA2394XX, Indianapolis, Indiana.

Kelly, "The Top Five Changes in Truck Technology", World Waste, vol. 37, No, 2, (Feb. 1994).

Smith, "The McCoy Truck Study", Skillings Mining Review, (Dec. 11, 1993).

Sensors Magazine, 1993 Buyers Guide, vol. 9, No. 12, Helmers Publishing, Inc., Peterboroguh, New Hampshire (ISSN 0746-9462), (Nov. 2, 1992).

Caterpillar® Publication No. 2215, entitled "Helping You Get the Most Out of Your Equipment", (1992).

Schaidle, "Earthmoving IN the Information Age", Society for Mining, Metallurgy, and Exploration, Inc., Reprint No. 94-48, pp. 1-7.

Zepco Publication entitled "ZTR 9200 Trip Recorder", (Feb. 17, 1994).

Goodenough, "Airbags Boom When IC Accelerometer Sees 50G", Electronic Design Magazine (Aug. 8, 1991).

Weibmer, Article entitled "Mining Equipment into the 21$^{st}$ Century".

News Release from VORAD Technologies, entitled "Collision-Warning System Ready for Market Launch", Fleet Owner, (Feb. 1994).

Mele, article on VORAD Technologies, entitled "Cost of Truck Accidents Justifies Warning System", Fleet Owner, Mar. 1994.

News Release from VORAD Technologies, entitled "Collision-Warning System Monitors Road Ahead", Fleet Owner, (Apr. 1994).

Product Literature from VORAD Technologies, (Apr. 1994).

Kowalick, Thomas M., *Black Boxes*—"Event Data Recorders", published by *MICAH*, Southern Pines, NC, Copyright © 2005; ISBN 0-9746556-5-1; (373 total pages).

Kowalick, Thomas M., *Fatal Exit*—"The Automotive Black Box Debate", *IEEE Press, Wiley-Interscience*, A John Wiley & Son, Inc. Publication, New Jersey, Copyright © 2005 ISBN 0-471-69807-5; (pp. 1-241).

Part 2 of Doc. No. EP (pp. 1-241).

Connell, James P., "Automated Vehicle Locator Systems", *Western Mining Industry Electrotechnology Conference Proceedings*, 1981.

"Automobile Collision Data: An Assessment of Needs and Methods of Acquisition", prepared at the request of The House Appropriations Committee, Office of the Technology Assessment, Feb. 1975—NTIS order #PB-244867, 80 pages including cover page, and Table of Contents.

Automobile Collision Data: An Assessment of Needs and Methods of Acquisition, prepared at the request of The House Appropriations Committee, Office of the Technology Assessment, Feb. 1975—NTIS order #PB-244867, 172 total pages including cover page, and Appendices A-P.

Menig, Paul at al, "Transportation Recorders on Commercial Vehicles", *International Symposium on Transportation*, retrieved from (http://www.ntsb.gov/events/symp_rec/proceedings/authors/menig.pdf on Nov. 19, 2010 (14 pages).

Chidester, Augustus, et al., "Recording Automotive Crash Event Date", *International Symposium on Transportation Recorders*, May 3-5, 1999 (Arlington, VA) (15 pages).

Donnelly, Bruce R., "The Automated Collision Notification System", *International Symposium on Transportation Recorders*, May 3-5, 1999 (Arlington, VA) (14 pages).

Chidester, Augustus, et al., "Real World Experience with Event Data Recorders", National Highway Traffic Safety Administration, United States of America; Paper No. 247 *IEEE*, Dec. 10, 2004 (11 pages).

Thompson, Robert, et al., Presentation entitled "Summary of Swedish Research Using Crash Recorder Data", *IEEE-Standards Association Project 1616 Report*: (Dec. 4, 2002) (Chalmers University of Technology) (20 pages).

German, Alan, et al "The Use of Event Data Recorders in the Analysis of Real World Crashes", *Proceedings of the Canadian Multidisciplinary Road Safety Conference XII*, London, Ontario, (Jun. 10-13, 2001), pp. 1-15.

Seat Belt Event Data Recorder (SB-EDR), Southern Pines, North Carolina (1 page) *International Symposium on Transportation Recorders*, May 3-5, 1999 (Arlington, VA).

Champion, Howard R., et al., "Reducing Highway Deaths and Disabilities with Automatic Wireless Transmission of Serious Injury Probability Ratings from Crash Recorders to Emergency Medical Services Providers", *International Symposium on Transportation Recorders*, May 3-6, 1999, Arlington, Virginia, (16 pages).

EDR Research, NHTSA—Event Recorder (EDR Research Applications of Articles, Products and Research ((NHTSA)—National Highway Traffic Safety Administration) retrieved from http://www.nhtsa.gov/Research/Event+Data+Recorder+(EDR)/Event+Data+Recorder+(EDR)+Research+Applications+of+Articles,+Products+and+Research on Nov. 19, 2010 (13 pages).

"Indy race cars are equipped with Crash Data Recorders to improve safety", Instrumented Sensor Technology—retrieved from http://www.nhtsa.gov/DOT/NHTSA/NRD/Articles/EDR/PDF/Research/Indy_race_cars_are_equipped$_{13}$ with_CRASH_DATA_RECORDERS-safety.pdf on Nov. 19, 2010 (2 pages).

Correia, J.T., et al. Table condensed from the *Proceedings of the Canadian Multidisciplinary Road Safety Conference XIIII* Jun. 10-13, 2001, London Ontario, 2 pages.

Accident Data Recorder 2 (ADR 2), Delphi Automotive Systems, New Features, retrieved from http://www.nhtsa.gov/DOT/NHTSA/NRD/Articles/EDR/PDF/Research/Delphi-ADR2-features_page.pdf on Nov. 19, 2010 (2 pages).

Automotive Crash Notification, "Your Car Can Save Your Life", ComCARE Alliance (Communication for Coordinated Assistance and Response to Emergencies) retrieved from http://www.nhtsa.gov/DOT/NHTSA/NRD/Articles/EDR/PDF/Research/ComCARE_ACN_System.pdf on Nov. 19, 2010 (2 pages).

Accident Data Recorders, "A Contribution to Road Safety", VDO Kienzie Sales and Services GmbH, Mar. 1999; VO2, pp. 1-26.

NHTSA—National Highway Traffic Safety Administration—retrieved from http://www.nhtsa.gov/Research/Event+Data+Recorder+(EDR)/Event+Data+Recorder+(EDR)+Research+Applications+of+Bibliography on Nov. 19, 2010 (18 pages).

* cited by examiner

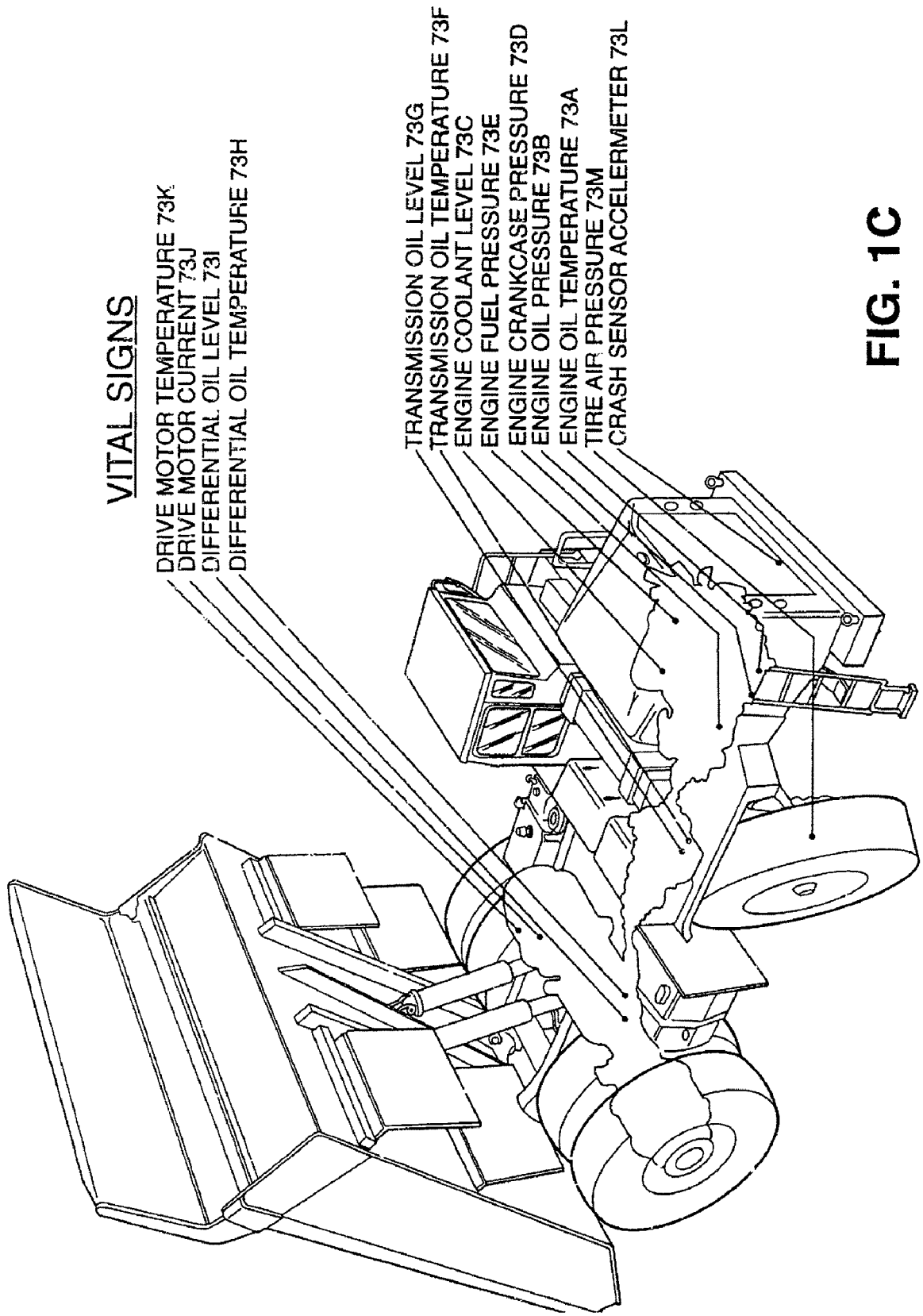

PRODUCTION MONITORING

READ & STORE PRODUCTION WORK RELATED INPUTS

APPARATUS FOR TRACKING AND RECORDING VITAL SIGNS AND TASK-RELATED INFORMATION OF A VEHICLE TO IDENTIFY OPERATING PATTERNS

CROSS REFERENCE TO RELATED APPLICATIONS

This patent application is a divisional of U.S. application Ser. No. 11/410,648 filed on Apr. 25, 2006 (Now U.S. Pat. No. 7,765,039), which is a divisional of U.S. application Ser. No. 10/383,822 filed on Mar. 7, 2003 (Now U.S. Pat. No. 7,039, 507), which is a continuation of U.S. application Ser. No. 08/448,764 filed on May 24, 1995 (Now U.S. Pat. No. 6,546, 363), which is a divisional of U.S. application Ser. No. 08/196,480 filed on Feb. 15, 1994 (Abandoned).

TECHNICAL FIELD OF THE INVENTION

The invention generally relates to the identification of anomalies in the operation of a vehicle and, more particularly, to the collection and analysis of data derived during operation of a vehicle that provides a basis for diagnosing the cause of anomalies in the vehicle's operation.

BACKGROUND OF THE INVENTION

All vehicles today have various sensors for identifying and tracking critical "vital signs" of a vehicle. In their simplest form, these sensors include an oil pressure gauge, a water temperature gauge and an electrical system charging/discharging gauge. In more sophisticated vehicle systems, these vital signs may be expanded to include the condition of the brake system, transmission shift indicator, and so forth. In fact, for every component or subassembly of a vehicle, a sensor can be adapted for indicating whether that component or subassembly is operating in a routine or "critical" state—i.e., a state that if maintained will cause the component or subassembly to fail.

Like the monitoring of vital signs, it is also known to employ sensors on-board a vehicle to track performance of the vehicle. An example of such an on-board system is illustrated in U.S. Pat. No. 4,839,835 to Hagenbuch. By sensing and monitoring vehicle parameters related to the task being performed by a vehicle, a record can be established that describes how effectively the vehicle is performing and provides the operator of the vehicle with information from which future operations of the vehicle can be planned to maximize performance. Task-related parameters are parameters such as load carried by a vehicle, grade of the road on which the vehicle is operating, loads hauled per hour, tons hauled per hour, and the like. In general, the task-related parameters are those parameters that provide indicia of the work done by the vehicle, where work is proportional to the weight of a vehicle multiplied by distance it is carried. Production performance of the vehicle is generally evaluated in the amount of work done by the vehicle in a unit of time—e.g., miles per hour, tons per hour and the like.

Today, there are many companies producing equipment for monitoring the state of health of a vehicle's components and subassemblies—i.e., its "vital signs." There are also many companies producing vehicle production monitoring equipment. However, to the best of applicant's knowledge, none of these products has integrated vehicle production with vehicle condition. It is expensive to operate all vehicles and, in particular, large load-carrying vehicles such as trucks. Accordingly, in an effort to improve the up time or operating time of the vehicle, it is very important to monitor the critical vital signs of a vehicle. However, in addition to simply monitoring these vehicle critical vital signs, it is even more important to know what caused a vehicle vital sign to reach a critical condition that, if continued, will cause failure of a component or subassembly. When taken as disparate items, tracking either vital signs or production parameters gives only a partial picture of a vehicle's operation.

SUMMARY OF THE INVENTION

It is the general object of the invention to diagnose the cause of anomalies in the values of the state-of-health parameters of a vehicle.

It is a related object of the invention to employ the foregoing diagnosis to control the operation and use of the vehicle to reduce the severity and number of anomalies of the values of the state-of-health parameters of the vehicle, thereby extending the useful life of the vehicle while maintaining production goals.

It is also an important object of the invention to provide a historical record of the values of the condition and performance parameters of a vehicle, which can be used to schedule future maintenance and utilization of a vehicle.

It is yet another important object of the invention to provide to the user of a vehicle real-time information regarding the degree with which the vehicle is being utilized—i.e., the maximization of all performance and condition parameters within their normal ranges. It is a related object of the invention to signal the user of a vehicle whether the utilization of the vehicle at the moment is optimum and to also indicate whether the user has utilized the vehicle over a known time period (e.g., a work shift) in a manner that meets expectations.

These and other objects and advantages of the present invention, as well as additional inventive features, will be apparent from the description of the invention provided herein.

Briefly, the invention identifies a poor state of health of a vehicle and provides data regarding the recent use of the vehicle that can be used to effectively diagnose the cause of the poor health. Operating the vehicle beyond its normal operating conditions stresses components and subassemblies. If stressed to an extreme or for a long period of time, the component or subassembly may fail. On the other hand, under-utilization of the vehicle results in undue operating expenses and inefficient use of the vehicle. Therefore, the invention also provides a visual prompt to the operator of the vehicle on a substantially real-time basis an evaluation of the efficiency of the vehicle's operation with respect to a predetermined norm for an assigned task. With these two aspects of the invention, the operator of the vehicle is encouraged to operate the vehicle efficiently while at the same time being mindful that overstressing the vehicle to make up for a period of inefficiency will be recorded and noted by the operator's supervisors.

An electronic processor on-board the vehicle acquires vital sign data and work-related data at predetermined time intervals from sensors mounted to the vehicle for providing a set of vital sign data and a set of work data. The sensors that provide vital sign data sense parameters of the vehicle's subassemblies and components that are indicative of their state of health. The sensors that provide the work data sense parameters that are indicia of the task performed by the vehicle and of the amount of work the vehicle has done in performing the task. A memory is associated with the electronic processor and stores the vital sign and work data acquired by the processor in a format that allows the data to be retrieved from the memory in a manner that correlates the vital sign and work data. The processor includes a device for detecting a failure mode of the vehicle, where the failure mode is a value of one of the vehicle's state-of-health parameters that indicates a component or subassembly of the vehicle is in a poor state of health and failure of the component or subassembly is impending. In response to a detection of the failure mode, the processor provides indicia in the memory that identifies the time the failure occurred and the chronology of the values of the production-related data immediately preceding the time the failure mode occurred. In the illustrated embodiment, the indicia is data that identifies which one of the vital sign sensors has reached a critical condition and the value of the output signal from the vital sign sensor that caused detection of the failure mode.

When the failure mode detects a crash of the vehicle, it is particularly desirable to continue acquiring and storing production-related data during the entire crash event. In terms of the sensor readings, it is therefore desirable to provide indicia in the memory for the duration of the time period that the vehicle is moving after a crash event has been sensed.

In the illustrated embodiment, the indicia is provided by a memory that permanently stores an anomaly of a vital sign sensor with a chronology of the work-related sensors for a predetermined period of time immediately preceding the processors sensing the anomaly in the vital sign sensor. Other types of indicia can alternatively provide a record for later use in diagnosing anomalies in the operation of the vehicle.

In another aspect of the invention, a predetermined number of the most extreme values of the data sampled from the vital sign sensors are stored in memory for later use in diagnosing a failure mode of the invention or in planning the future operation of the vehicle.

Finally, the invention provides a substantially real-time analysis of the production efficiency of the vehicle and reports to the operator of the vehicle whether he is presently below, at or above expected efficiency. In the illustrated embodiment, the expected efficiency of the vehicle is a rate of production norm that assumes operation of the vehicle in a normal mode, meaning operation of the vehicle with full loads and within the normal ranges of values for the vital sign parameters of the vehicle.

BRIEF DESCRIPTION OF THE DRAWINGS

The invention may best be understood with reference to the accompanying drawings wherein an illustrative embodiment is shown and in the following detailed description of the preferred embodiment. Although the illustrated embodiment of the invention is shown in the environment of a haulage vehicle, the invention is also applicable to passenger vehicles such as automobiles, buses and the like. Indeed, any type of vehicle may incorporate this invention, particularly with respect to diagnosing the cause of a crash event.

FIG. 1C is the vehicle of FIG. 1A illustrating the location of a plurality of sensors that provide information regarding the state of health of the vehicle;

FIG. 7A is a state machine diagram for the diagnostic system of FIG. 2 illustrating the comparison of the value of the data from a vital sign sensor with each of the historical ten most extreme values of the data of that sensor in order to identify anomalies in the operation of the vehicle;

DETAILED DESCRIPTION OF THE PREFERRED EMBODIMENT

Figure 1A:
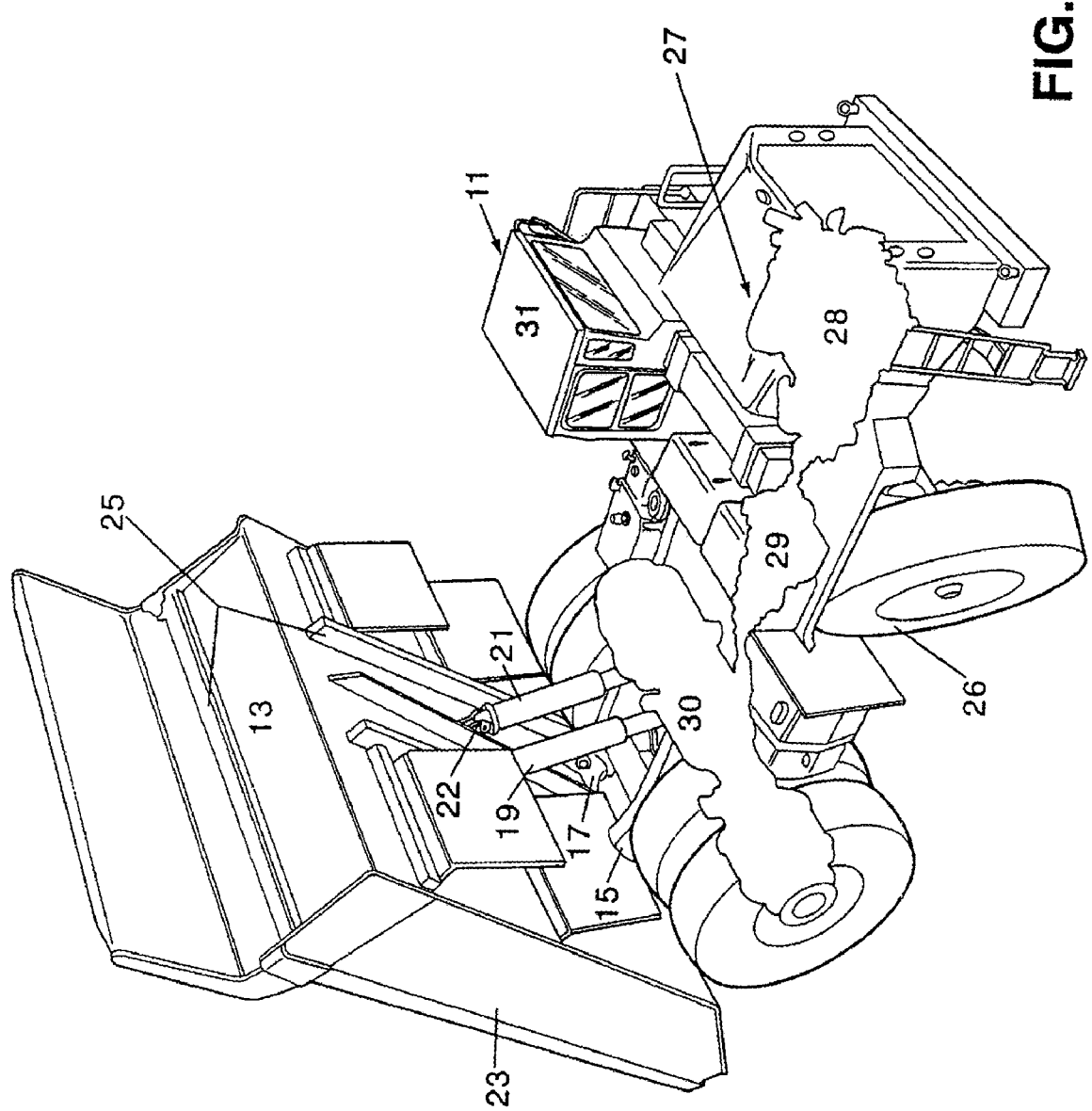
FIG. 1A is a perspective view of a haulage vehicle incorporating the diagnostic system of the present invention.

Turning to the drawings, and referring first to FIG. 1A, an exemplary vehicle 11 incorporates the diagnostic system of the invention and includes a body 13, which is hinged to the frame 15 of the vehicle at two complementary hinge assemblies 17, only one of which can be seen. By controlling the extension of telescoping hydraulic cylinders 19 and 21, the truck body 13 is pivoted between a fully inclined or dump position and a lowered or rest position. One end of each hydraulic cylinder 19 and 21 is fastened to a hinge assembly (not shown) located on the bottom of the vehicle body 13. The opposing end of each cylinder 19 and 21 is fastened to an articulation 22 on the frame 15 of the vehicle 11, of which only one can be seen in FIG. 1A. Structurally, the body 13 of the vehicle 11 consists of steel panels 23, which form the shape of the body, and beams 25 which provide the structural framework of the body.

In silhouette in FIG. 1A is the drive train 27 of the vehicle 11. The drive train includes three main subassemblies; namely, the prime mover or engine 28, the transmission 29 and the drive axle 30. In mechanical drive trains, the drive axle 30 is mechanically coupled to the transmission 29 by way of a differential. In an electrical drive train, electric motors are located at each end of the axle 30 and the transmission 29 is replaced by a generator (not shown) electrically coupled to the electric motors. Both types of drive trains are well known in vehicles such as the vehicle 11.

Often, trucks, such as the vehicle 11 shown in FIG. 1A, are very large. For instance, it is not uncommon for the diameter of one of the tires 26 of the vehicle 11 to be as great or greater than the height of an average man. Accordingly, the tremendous size of these vehicles makes them expensive to operate and repair. Since these vehicles represent both a large capital investment and a large operating expense, preventing both overloading of the body 13 and under-utilization of its load capacity (i.e., underloading) are important considerations in ensuring the vehicle is operated in the most profitable manner. In particular, if the vehicle 11 is overloaded, it will tend to have a shorter usable life because of the excessive wear caused by the overloading. On the other hand, if the vehicle 11 is underloaded, the vehicle must be operated over a longer period of time to achieve the same results that are achieved when the vehicle is fully loaded, thereby consuming more fuel and wearing the parts of the vehicle to a greater degree than necessary. Therefore, the ability to accurately measure the amount of work performed by the vehicle 11 is important to evaluating and ensuring its efficient operation. Also, since these vehicles are extremely expensive to operate, information regarding performance of the vehicle can be of great economic value since performance-related data can be used to ensure these expensive vehicles are utilized in their most efficient and profitable manner.

Typically, a shovel or front-end loader is used to fill the body 13 of the vehicle 11. With a front-end loader (not shown), material is loaded into the body 13 of the vehicle 11 by a bucket located at the end of an arm of the loader. The body 13 has a weight and volume capacity that normally requires the dumping of a plurality of loaded buckets into the body 13 in order to load the body to its full capacity. Even though the operator of the front-end loader is at an elevated level when operating the loader, he or she may not be in a position to see over the top of the body to determine the level of loading. Moreover, the material loaded into-the body 13 of the vehicle 11 often has varying densities, causing the operator of the loader to guess how much material can be safely loaded without overloading the vehicle. Consequently, it is difficult to exactly control the amount of material loaded into the body 13 so that the vehicle 11 hauls an optimum amount of material.

Recently, it has become increasingly common for heavy-duty vehicles such as the vehicle 11 in FIG. 1A to include a plurality of sensors distributed about the vehicle for the purpose of monitoring certain important performance and vital sign parameters. For example, many systems are available for vehicles such as vehicle 11 that monitor the state of health of various important subassemblies and components of the drive train 27. Typically, gauges or lights are mounted to a panel in the cab 31 of the vehicle 11 in order for the operator of the vehicle to monitor each of the sensors and be alerted to any critical state the may effect the state of the health of the vehicle if not corrected. One such system is an Electronic Monitoring System (EMS) by Caterpillar, Inc. of Peoria, Ill., which is described in Caterpillar's publication No. SENR2945. Other systems are:

(1) Detroit Diesel Corporation's Electronic Controls DDEC—Brochure No. 7SE 414, Canton, Ohio.
(2) Allison Transmission—Brochure No. SA2394XX, Indianapolis, Ind.
(3) Eaton Corporation's Tire Pressure Control System.

Systems such as these distribute sensors about the vehicle 11 in order to monitor the state of health of critical subassemblies and components. On-board systems that track performance of the vehicle 11 are also known and have become increasingly popular in recent years. An example of an on-board performance evaluation system is the OBDAS Monitoring System, manufactured by Philippi-Hagenbuch, Inc. of Peoria, Ill. 61604, which incorporates the invention described in U.S. Pat. No. 4,838,835.

Figure 1B:
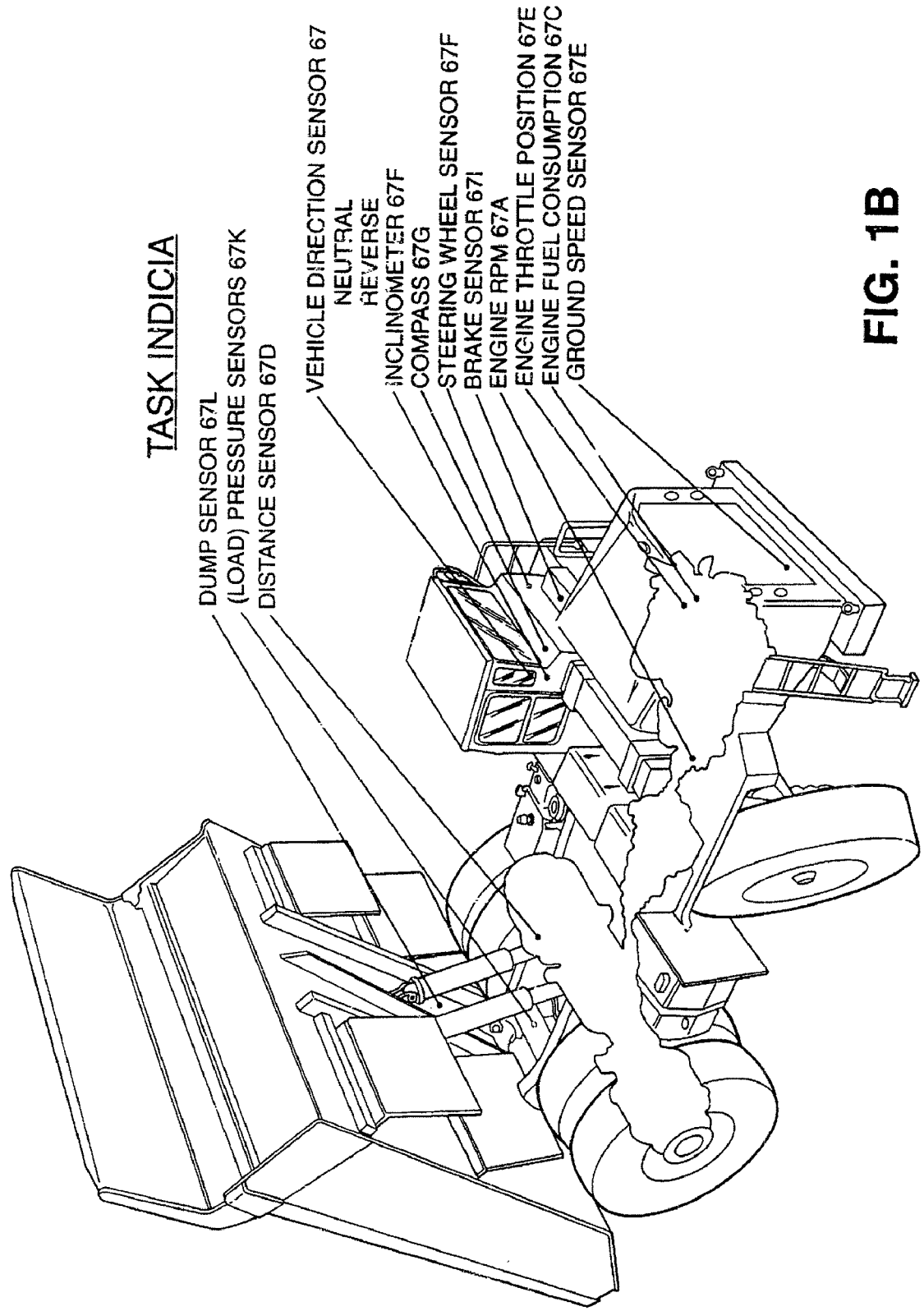
FIG. 1B is the vehicle of FIG. 1A illustrating the location of a plurality of sensors that provide information or indicia from which the work performed by the vehicle can be evaluated in accordance with the invention.

In the vehicle 11 illustrated in FIG. 1C, various sensors monitor vital signs of subassemblies and components of the vehicle. In the vehicle 11 illustrated in FIG. 1B, sensors monitor parameters related to the vehicle's production—i.e., the work performed by the vehicle 11. The vehicle 11 in FIGS. 1B and 1C includes the following sensors in keeping with the invention:

FIG. 1B—Production-related Sensors 67
1. Engine RPM 67A
2. Throttle position 67B
3. Engine fuel consumption 67C
4. Distance traveled 67D
5. Ground speed 67E
6. Inclinometer 67F (vertical axis)
7. Angle of turn 67G (horizontal axis)
8. Steering Wheel 67H
9. Status of brake 67I
10. Vehicle Direction 67J
11. Load sensor 67K
12. Dump sensor 67L FIG. 1C—Vital Signs Sensor 73
1. Engine oil temperature 73A
2. Engine oil pressure 73B
3. Engine coolant level 73C
4. Engine crankcase pressure 73D
5. Engine fuel pressure 73E
6. Transmission oil temperature 73F
7. Transmission oil level 73G
8. Differential oil temperature 73H
9. Differential oil level 73I
10. Current amperes to drive motor 73J (on electric drive vehicles only)
11. Drive motor temperature 73K (on electric drive vehicles only)
12. Crash 73L
13. Tire air pressure 73M Each of the foregoing vital sign and production-related sensors 73 and 67 is a well known sensor that is commercially available. See *Sensors Magazine,* 1993 Buyer's Guide, Nov. 2, 1992, Vol. 9, No. 12, Helmers Publishing, Inc., Peterborough, N.H. 03458-0874 (ISSN 0746-9462). With respect to the load and dump sensors 67K and 67L, the weight of the load and when it is dumped can be sensed as described in the above-identified U.S. Pat. No. 4,839,835 or, alternatively, the weight of the load can be sensed by the change in fluid pressure of the hydraulic suspension system of the vehicle 11 such as disclosed in U.S. Pat. Nos. 4,635,739 and 4,835,719.

Figure 2A:
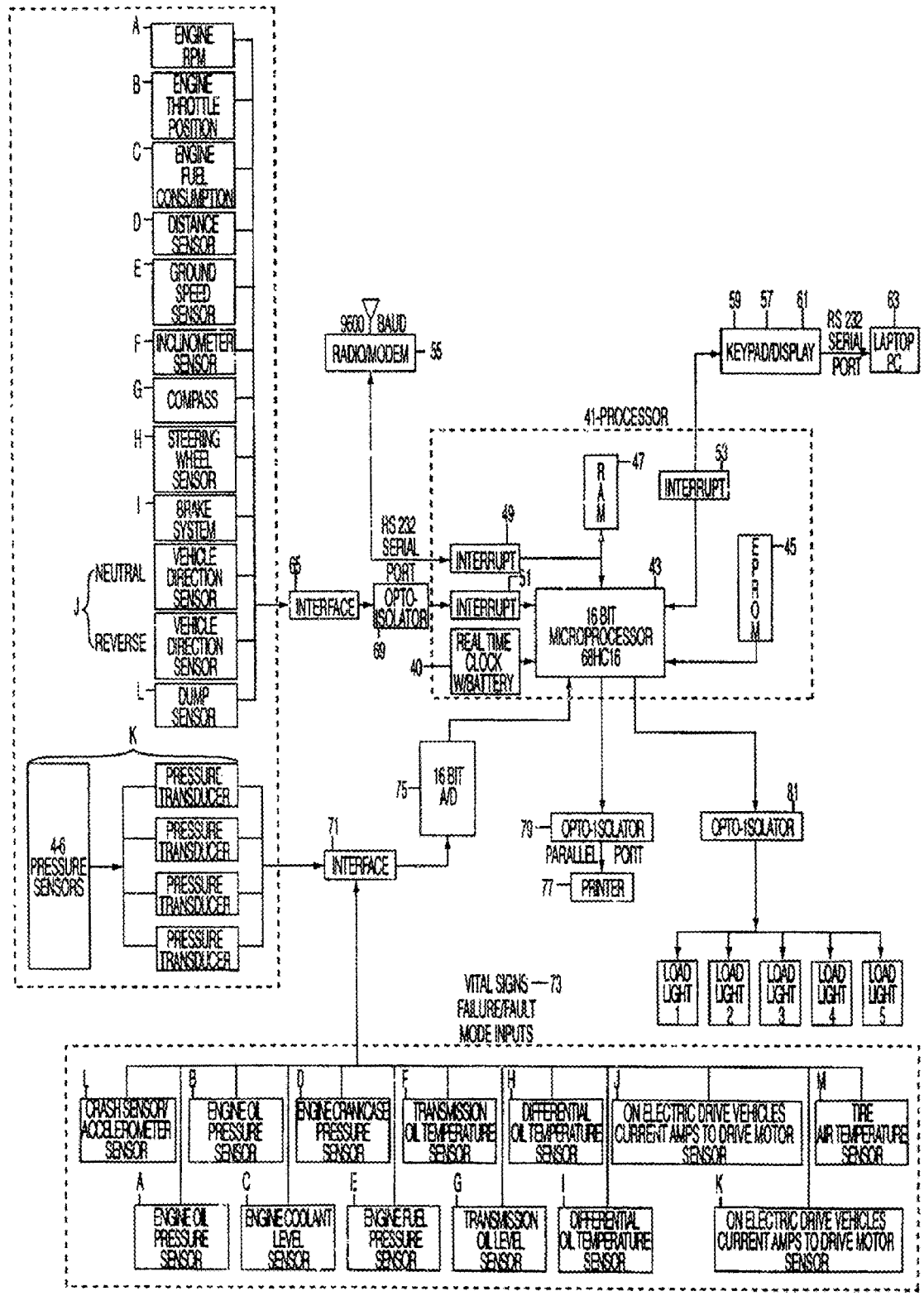
FIG. 2A is a schematic block diagram of the hardware architecture of the diagnostic system of the invention, which is incorporated in the vehicle of FIGS. 1A-1C.

The hardware architecture of the diagnostic system according to the invention is schematically illustrated in FIG. 2A. A processor 41 of the system is of a conventional configuration, including a 16-bit microprocessor 43 (a 68HC16 processor by Motorola) and an associated real-time clock 40 with battery power backup. An EPROM 45 contains the program executed by the microprocessor 43. A RAM 47 stores dynamic information collected by the microprocessor 43 under program control in accordance with the invention. In a conventional manner, interrupts 49, 51 and 53 interface the microprocessor with various peripheral devices. Specifically, the interrupt 49 interfaces the microprocessor 43 to a radio transceiver and an associated modem 55 by way of an RS-232 serial port. The interrupt 53 interfaces the microprocessor 43 with a control head 57 that includes a keypad 59 and a display 61. From an RS-232 serial port in the control head 57, a lap top personal computer 63 can be coupled to the microprocessor 43 for downloading data contained in the RAM 47.

An interface 67 controls the transmission of data from the groups of work-related sensors 67 to the microprocessor 43 via the interrupt 51 and a opto-isolator 69. Similarly, an interface 71 controls the transmission of analog data from the group of the vital sign sensors 73 and the pressure transducers 67K to the microprocessor 43 via an analog-to-digital converter 75. A printer 77 is connected to the microprocessor 43 through a parallel port via an opto-isolator 79. Finally, the microprocessor is also coupled to drive load lights one through five by way of an opto-isolator 81.

By appropriate programming of the processor 41, the transceiver 55 can provide for downloading the data held in the RAM 47 as explained more fully hereinafter. The downloading can be done in real time as the data accrues or it can be downloaded in response to polling from a base station. In keeping with the invention, a crash event sensed by the processor 41 as explained hereinafter may automatically key the transceiver 55 to download the data in the RAM 47 and also serve to broadcast a distress signal, which serves to alert other personnel (e.g., at a central station) that immediate aid may be required.

Figure 2B:
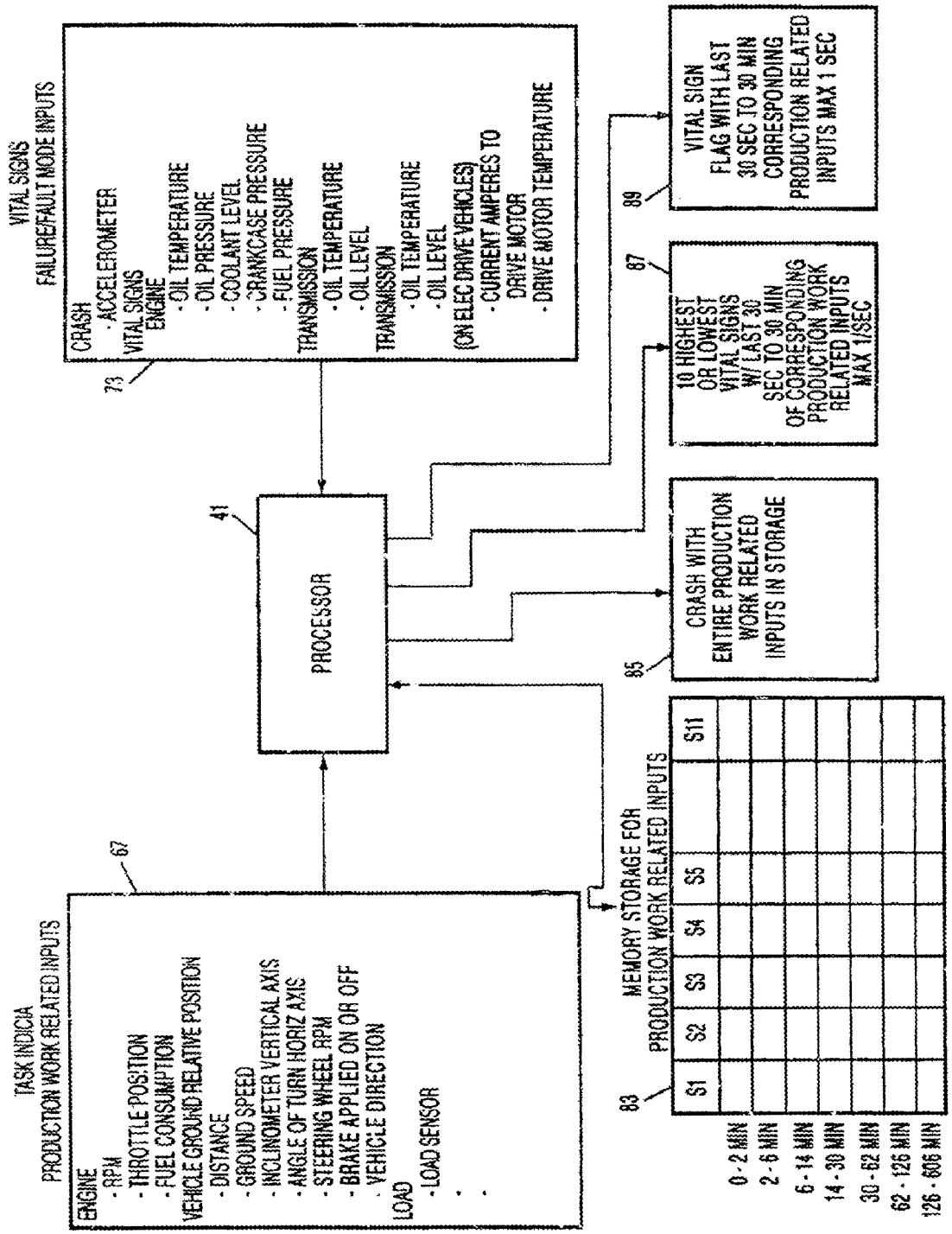
FIG. 2B is a functional block diagram of the diagnostic system of the invention with respect to diagnosing a failure mode of the vehicle.

FIG. 2B is a functional block diagram of the diagnostic system with respect to one aspect of the invention. As FIG. 2B indicates, the processor 41 receives data from both the production-related sensors 67 and the vital sign sensors 73. As explained more fully hereinafter, the processor 41 periodically samples the data from the production-related sensors 67 and stores that data in a memory storage 83 for production-related inputs.

Briefly, this memory 83 provides a historical database of sampled data from the production-related sensors 67 for the last approximate 606 minutes (about ten hours). In response to detection of anomalies in the values sampled to the processor 41 from the vital sign sensors 73, the processor transfers some or all of the historical data in the memory storage 83 to diagnostic memories 85, 87 and 89 in FIG. 2B.

In response to detection of a crash of the vehicle 11 from a high value of the data received from the accelerometer, the processor 41 stores all of the historical data maintained in the memory storage 83 into the diagnostic memory 85. If the processor 41 detects a value of one of the vital sign sensors 73 exceeding a pre-program critical value, the processor stores into the diagnostic memory 89 the identity of the vital sign sensor, the value of its data and a chronology of some or all of the production-related data from the historical database in the memory storage 83. Preferably, the chronology of the production-related data stored into the diagnostic memory 89 is data sampled at approximately one second intervals. Finally, the diagnostic memory 87 maintains the ten most extreme readings from each of the vital sign sensors 73. With each new data sampling of the vital sign sensors 73 by the processor 41, the list of the ten most extreme readings for each of these sensors, is updated. If a new sampling of the data from a vital sign sensor 73 results in an identification of that reading as one of the historical ten highest or lowest readings, the smallest of the values (i.e., the least extreme) stored in the memory 87, it is deleted and the new value is entered in its place. Also, the diagnostic memory 87 includes address locations for storing a chronology of the work-related sensors 67 derived from the memory storage 83 at the time each of the extreme values was identified. Preferably, the data in the chronology of the work-related values stored in the diagnostic memory 87 are sampled at a maximum rate of once per second.

Figure 2C:
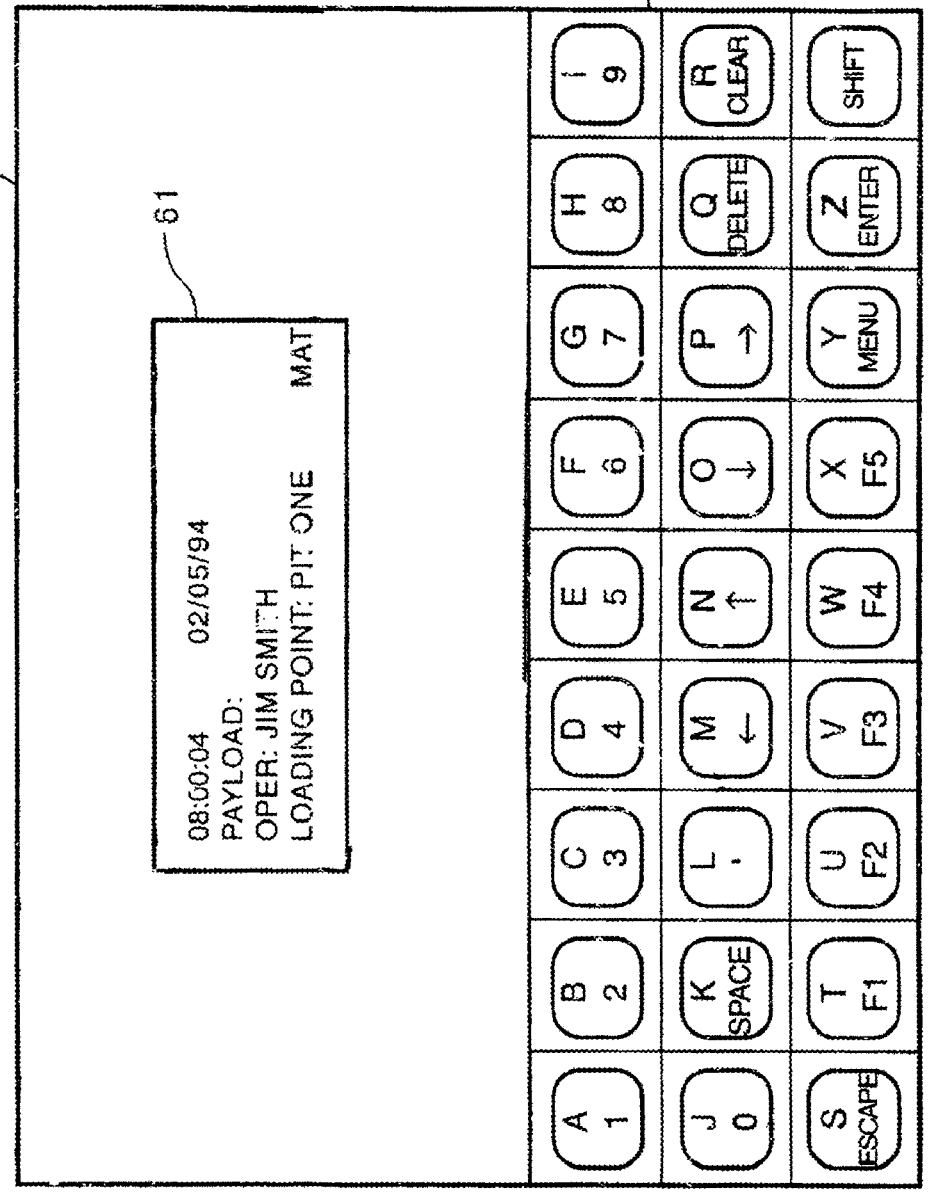
FIG. 2C is a front view of a control panel for the diagnostic system of the invention, which includes a keypad and an LCD display.

FIG. 2C is a plan view of the control head 57 of the diagnostic system according to the invention. The control head 57 includes the keypad 59 and the display 61. The display 61 is a liquid crystal display (LCD) that provides four lines of text. The keypad 59 includes a shift key 60 that provides for each of the other keys to perform two functions, depending on the state of the shift key as is well known in the art of computer-based systems.

In accordance with one important aspect of the invention, the processor 41 of the diagnostic system determines an actual rate of production on a real-time basis, compares the actual rate to a pre-programmed goal and displays the results of the comparison on the screen of the display 61. To achieve this result, the processor 41 first accumulates in the RAM 47 the total weight of the loads hauled by the vehicle 11 during an operator's shift. The total weight is then divided by the elapsed operating time of the shift in order to determine a production rate. The calculated rate of production is compared with a production goal and the results of the comparison are periodically displayed to the operator of the vehicle 11 on the screen of the display 61, thereby providing the operator with an evaluation of the vehicle and the operator's performance as the operating shift progresses. The value of the pre-programmed production goal is selected to take into account the work area of the vehicle 11—e.g., the distance between load and dump sites, the difficulty of the route between load and dump sites and the like. In the simplest implementation of this feature of the invention implemented by the computer program of the Appendix, a single value for the production goal is programmed into the system and stored in memory. In a more sophisticated implementation, a table of production goals is correlated with different combinations of load and dump sites, loading equipment and dump site restrictions.

Figure 3A:
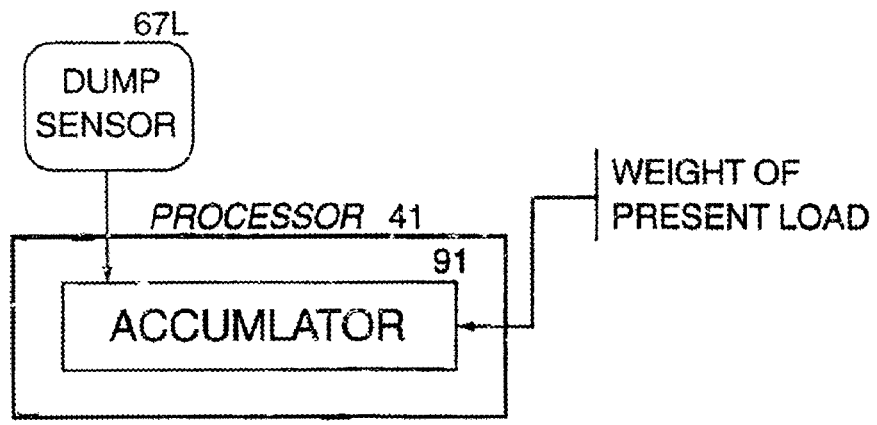
FIGS. 3A, 3B and 3C are each state machine diagrams for the diagnostic system of FIG. 2A in connection with its diagnosis of the rate of production of the vehicle.
Figure 3B:
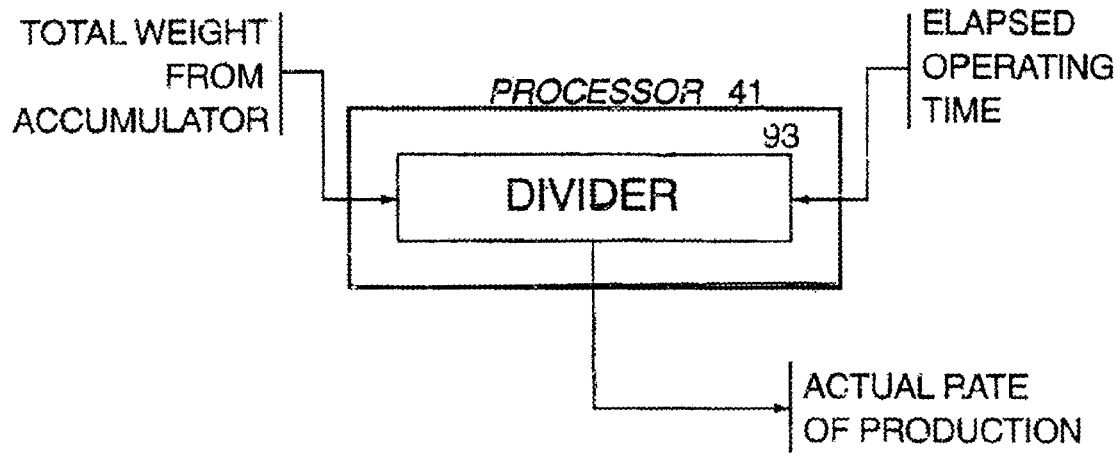
Figure 3C:
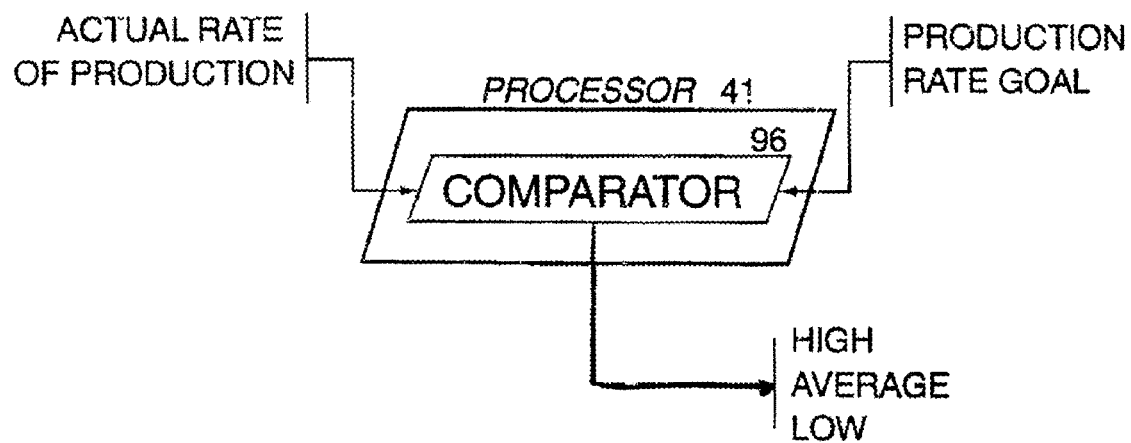

In executing this aspect of the invention, the processor 41 functions as a sequence of state machines, the most important of which are illustrated in FIGS. 3A, 3B and 3C. In FIG. 3A, the processor 41 functions as an accumulator 91 to add the weight of a load that has just been dumped, as detected by the dump sensor 67L. Next, in FIG. 3B the processor 41 functions as a divider 93 whose numerator input is the total weight from the accumulator 91 and whose denominator input is the elapsed time of the operator's shift—i.e, the elapsed operating time. Finally, the actual production rate, which is the output of the divider 93, is one of two inputs to the processor 41 configured as a comparator 95 in FIG. 3C. The other input is the production goal stored in the RAM 47. The results of the comparison is an output from the comparator 95 that indicates whether the actual production is below, above or at an "average" production, which is a range of values surrounding the value of the production goal as explained in connection with the flow diagrams of FIGS. 11A-11C.

Figure 8:
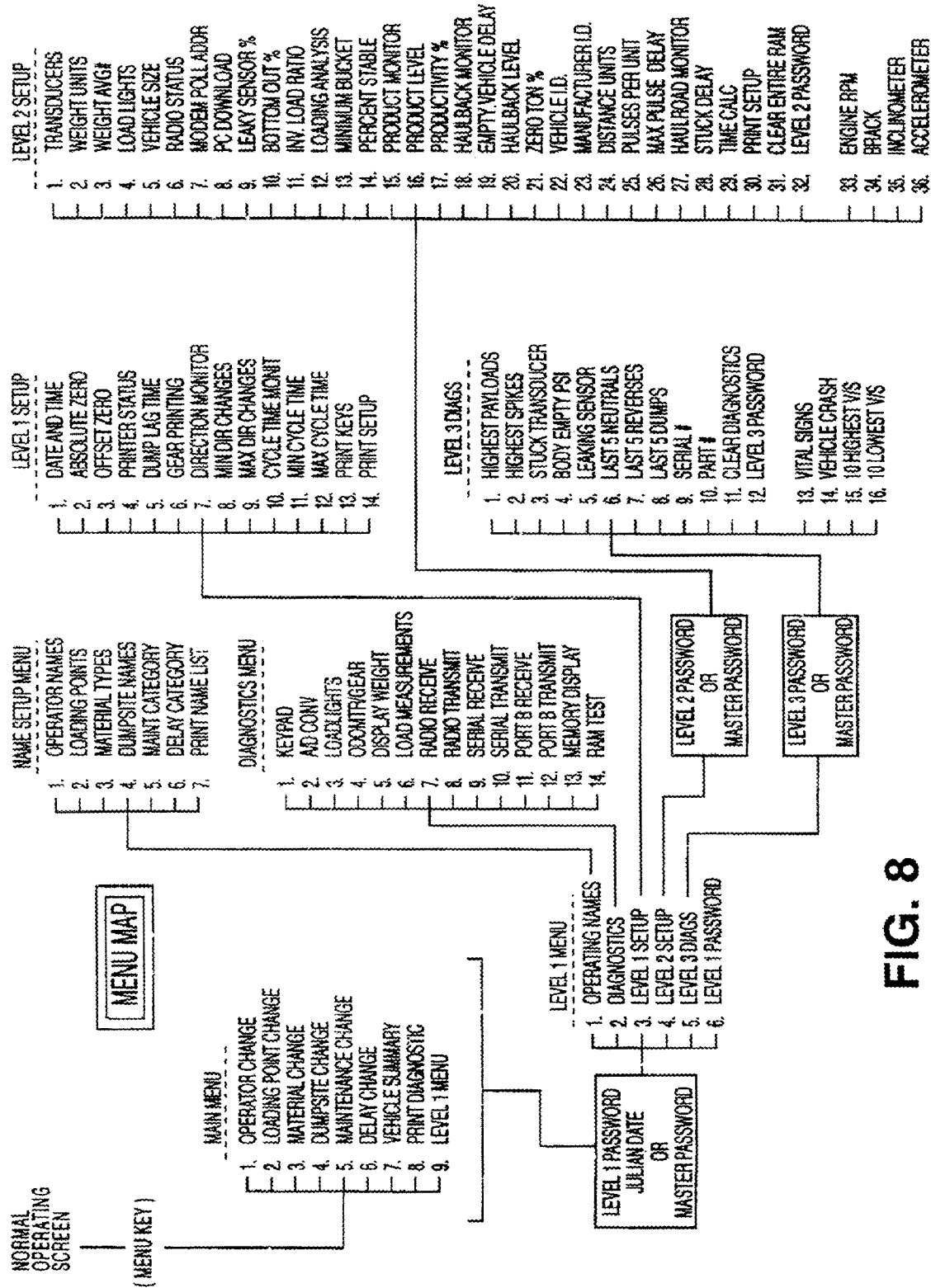
FIG. 8 is a map of data available from the diagnostic system of the invention, the data being accessed through a menu system as illustrated that employs a keypad and a display.

As explained more fully in connection with the menu map of FIG. 8, the operator of the vehicle may enter load and dump site information into the system by way of the keypad 59. If the vehicle 11 is re-assigned load and/or dump sites during a work shift, the value of the production goal may need to be adjusted to take into account differences in the new haul cycle, the haul cycle being a complete round trip in a work area. In other words, a "haul cycle" is defined as the route of the vehicle 11 from a load site, to a dump site and back to a load site or from a dump site, to a load site and back to a dump site. A "segment" of a haul cycle is any portion of the haul cycle, such as the route between a load and dump site and the time of travel or the elapsed time the vehicle 11 stays at either site (i.e., loading or dumping plus waiting time).

Figure 4:
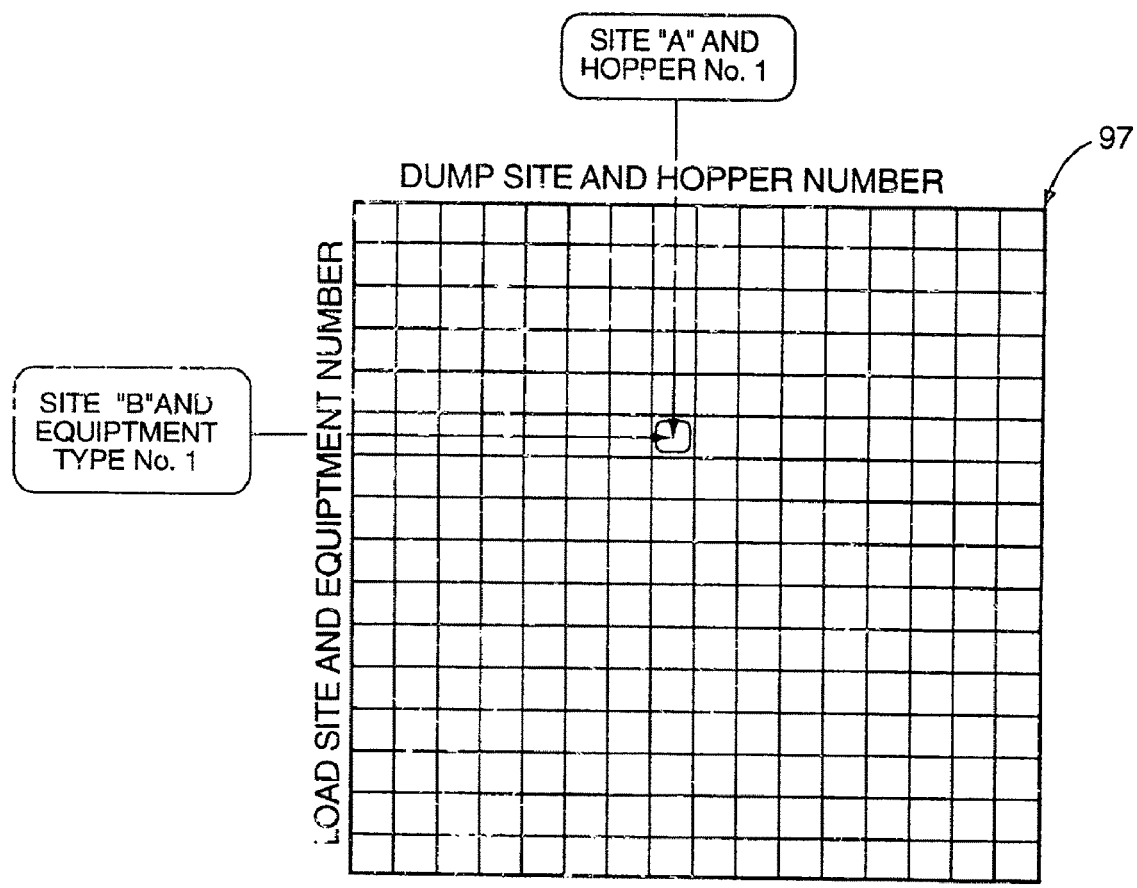
FIG. 4 is a memory map illustrating the format of a memory of the diagnostic system for a data base of production goals used by the state machine of FIGS. 3A-3C.

With the foregoing variability of the haul cycle in mind, the diagnostic system includes a memory of production goals such as the memory 97 of FIG. 4. As suggested by the illustration of the memory 97, it conceptually organizes values of production goals in rows and columns so that each variation of a haul cycle can be assigned its own value of the production goal, which is used by the state machines of the processor 41 in FIG. 3. The memory addresses of the rows in FIG. 4 are combinations of different load sites and loading equipment used in the work area of the vehicle. The memory addresses of the columns in FIG. 4 are the combinations of different dump sites and hopper/crusher equipment. As an example, FIG. 4 indicates load site B, dump site A, loader equipment No. 1 and hopper No. 1 have been entered into the system by way of the keypad 59 as information identifying the present haul cycle of the vehicle 11. The row and column addresses for this combination of sites and equipment identifies a value of the production goal at the location marked in FIG. 4. It is this value that is provided to the processor 41 in FIG. 3C when it is configured as the comparator 95.

In accordance with another important aspect of the invention, the diagnostic system includes a device for detecting a failure mode of the vehicle and capturing a chronology of the values of the production parameters immediately prior to the occurrence of the failure mode. The chronology is captured in a memory of the diagnostic system for later retrieval for the purpose of diagnosing the cause of the failure. A failure mode is identified when a value of one of the vital sign parameters reaches a critical value, that being a value either greater than or less than a reference value. The identity of the vital sign and its critical value that caused the failure mode to occur is stored and correlated with the captured chronology of the production parameters.

When the state of health of the vehicle 11 reaches a critical condition as determined by the system in response to the values of the vital sign sensors 73, the recent chronology of values read by the system from the production-related sensors 67 is stored in the memory 89, which is a number of address locations in the RAM 47 that preserves the data until an operator of the system removes it. The production-related parameters that provide useful chronologic information for diagnosing the cause of a failure mode are in three categories—i.e., engine, position and relative speed of the vehicle, and load. When the position, speed and total gross weight (i.e., tare weight plus weight of load) of the vehicle 11 are known, the value of the work being done by the vehicle can be determined. Thus, when vital signs are correlated with production parameters that define work, the relative efficiency of the vehicle 11 in its haul cycles can be monitored and diagnosed.

In keeping with the invention, the following production-related parameters exemplify the type of vehicle parameters that are monitored, temporarily stored in a memory and then permanently stored with vital sign data when a failure mode is detected.

1. Engine
   A. Engine RPM
   B. Engine throttle position, particularly as it relates to diesel engines
   C. Engine fuel consumption relative to work done by the vehicle, i.e. vehicle ground relative position data
2. Vehicle Ground Relative Position and Speed of the Vehicle
   A. Drive wheel RPM, speed and distance (speedometer/odometer). This parameter is useful with respect to a comparison to the actual ground speed of the vehicle (see item B). Wheel rotation data that does not correspond to ground speed data indicates wheel slippage.
   B. Ground speed or non-driven tire RPM, i.e. a steering tire typically. The ground speed of the vehicle 11 is particularly applicable to haulage vehicles and/or vehicles pulling a large load at speeds that would be considered off-highway speeds, speeds typically or seldom in excess of 30 MPH.
   C. Vehicle inclination or vehicle inclinometer. This is the grade the vehicle 11 is going up or down. Preferably, the inclinometer 67F in the illustrated embodiment includes both fore-to-aft and side-to-side data.
   D. Angle of turn. Is the vehicle turning or going straight through a compass input? Angle of turn is detected by a compass and compared with the amount and rate of turn of the steering wheel. This parameter is particularly useful in connection with diagnosing a crash of the vehicle 11. In the illustrated embodiment the angle of turn is detected by a compass 67G.
   E. Steering wheel angle and rate of turn. Sensing of this parameter is not implemented by one of the sensors 67 in the illustrated embodiment, but it may be desirable to include such a sensor in connection with diagnosing a crash event. The angle of the steering wheel and the rate of turning it immediately prior to a crash can complement the values of other parameters in diagnosing a cause of a crash.
   E. Vehicle braking. Two types of sensors can be employed for this parameter. One is a simple on/off status sensor. The other type of sensor senses the degree of braking by sensing the pressure of the fluid in the hydraulic brake lines. In the illustrated embodiment, the brake sensor 67I is preferably of the second type, which senses the degree of braking. This information can be particularly useful in connection with diagnosing a crash condition. For example, if the brakes are applied, what was the vehicle speed on brake application? What was the inclination or grade the vehicle on brake application? What was the grade of the vehicle relative to the distance traveled with the brakes applied? Over what distance were the brakes applied, and what was vehicle speed on release or brakes? As an adjunct to the braking question, what was the vehicle's total gross weight relative to the braking question? What was the load on the vehicle relative to the braking capability of the vehicle on the grade it was being driven on, at the speed it was being driven, on brake application.
   G. The status of the operator's seat belt is also a particularly useful parameter for diagnosing the cause of a crash event detected by the system. Although not included in the illustrated embodiment, sensor for sensing this parameter are well known.

H. Vehicle direction. In the illustrated embodiment, this parameter is senses by sensors that sense the position of a shift lever in the cab 31 of the vehicle. Specifically, a neutral and reverse sensor 67J sense this parameter in the vehicle 11.

I. Dump of a load. This parameter aids in defining a haul cycle of the vehicle. In the illustrated embodiment a dump sensor 67L is mounted to the body 13 of the vehicle 11 in order to sense the pivoting of the body, which is interpreted as a dump event by the processor 41.

3. Vehicle Load

A. Weight sensors such as those in the '835 patent.

In the illustrated embodiments, values for these parameters are provided the production-related sensors 67. As inputs from the sensors for the production-related parameters of the above items 1, 2, and 3 are read, they are recorded in the RAM 47 that is continually updated. The reading interval for these inputs is a minimum of four times a second, with the amount of data then stored to memory diminishing with time from when the reading was taken. In others words, readings taken most recently are all stored to the memory 83, and readings taken some time ago are gradually deleted from memory.

As an example of the pattern for retaining data from the production-related sensors 67 and vital sign sensors 73, the data that is stored in the memory 83 at any given instant is as follows:

A. For the last two minutes of vehicle operation, readings stored in memory are those taken at four times a second or 480 readings.

B. For the last two to six minutes of vehicle operation, the readings retained are those at the beginning of the second and half-way through a second, or two readings per second are retained for a total of 480 readings retained.

C. For the last six to 14 minutes of vehicle operation, one reading per second is retained in the memory 83 or, again, 480 readings.

D. For the last 14 to 30 minutes of vehicle operation, one reading that is taken every two seconds is retained or, again, 480 readings.

E. For the last 30 to 62 minutes of vehicle operation, one reading that is taken every fourth second is retained in the memory 83 or 480 readings.

F. For the last 62 to 126 minutes of vehicle operation, a reading that is taken every eight seconds is retained in the memory 83 or 480 readings.

G. Over the last 126 to 606 minutes of vehicle operation, one reading taken every minute is retained in the memory 83 or, again, 480 readings.

Vehicle default modes which could result in vehicle production work related inputs being recorded to the separate default mode memory would be:

A. Vehicle vital signs reaching a critical state. At that point, when the processor 41 detects a critical state, it records the critical state along with data from the production-related sensors 67 over the most recent "X" amount of time, with this amount of time being programmed according to the respective vehicle vital sign.

B. Vehicle crash as detected by the on-board vehicle accelerometer 73L. If a crash of the vehicle 11 is detected, then readings over the entire 606 minutes of past vehicle operation are recorded to the memory 85 along with the vehicle deceleration measurement in gravity units.

These are then the inputs—(1) production-related sensors 67 and (2) defaults inputs, vital sign sensors 73 or crash sensor (accelerometer 73L)—that are then correlated to create a system wherein a vehicle operator/owner can accurately identify the conditions in which the vehicle 11 was being operated that may have resulted in a vehicle default mode occurring.

At any given moment, the memory of the diagnostic system includes the following:

I. A chronology of the values of the production-related parameters as measured by the on-board sensors 67 for the last approximate 606 minutes.

II. The ten extreme (i.e., highest or lowest) values of each vital sign parameters read by the system from the sensors 73.

III. For each of the ten highest or lowest readings in II, a programmed time period of the most recent values from the production-related sensors 67 leading up to the highest/lowest vital sign reading.

When a value of one of the sensors 73 monitoring a vital sign parameter reaches a critical value or state, the system records the critical value along with a chronology of the values of the sensors 67 monitoring production-related parameters for a predetermined amount of time immediately preceding the critical value. The predetermined amount of time may be different for each vital sign parameter. For example, a high temperature of the engine coolant may only require that the last ten minutes of performance-related parameters be correlated with the critical value of the temperature. By way of comparison, a high temperature of the engine oil may require the last 30 minutes of values from the production-related parameters in order to effectively diagnose whether the cause of the high temperature was from overuse of the vehicle 11. In the case of the coolant temperature, it is more susceptible to fluctuation than the engine oil and, thus, a lesser history of the production-related parameters is required for a diagnosis. In the case of a crash as detected by the accelerometer 73L on-board the vehicle 11, however, the entire 606 minutes of readings from the production-related sensors 67 are stored along with a value of the deceleration of the vehicle measured by the accelerometer.

Figure 5A:
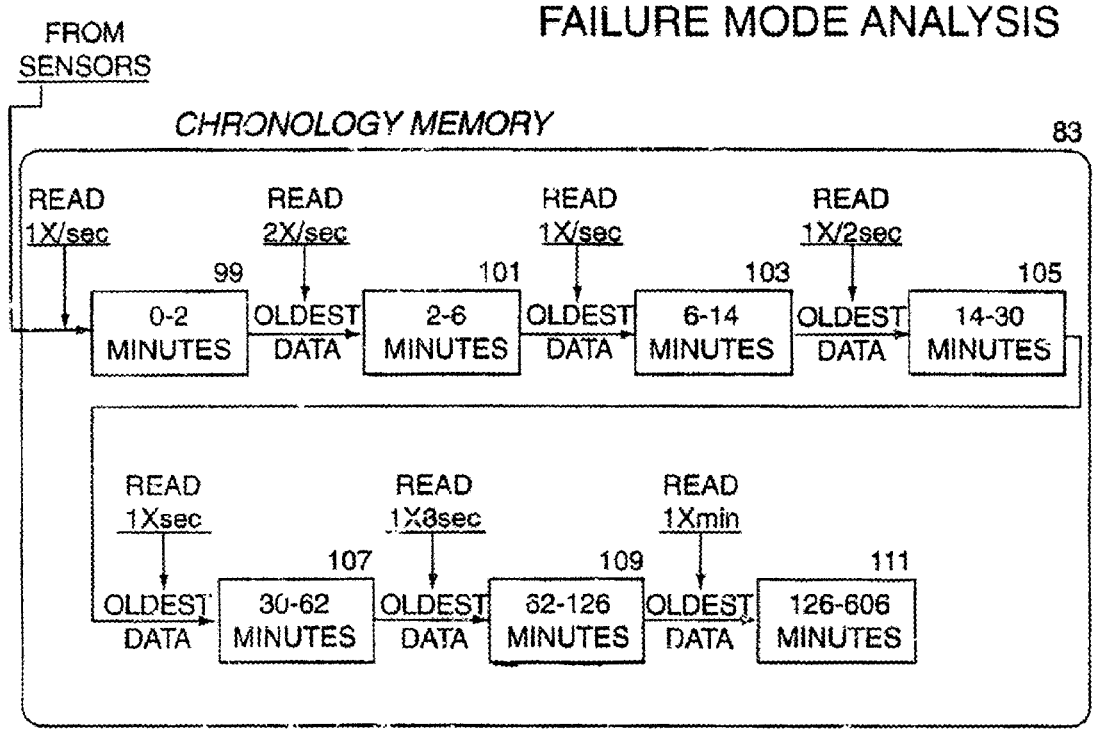
FIG. 5A is a memory map illustrating the format of a chronology memory of the diagnostic system for building a historical data base recording events leading up to the detection of a failure mode.
Figure 5B:
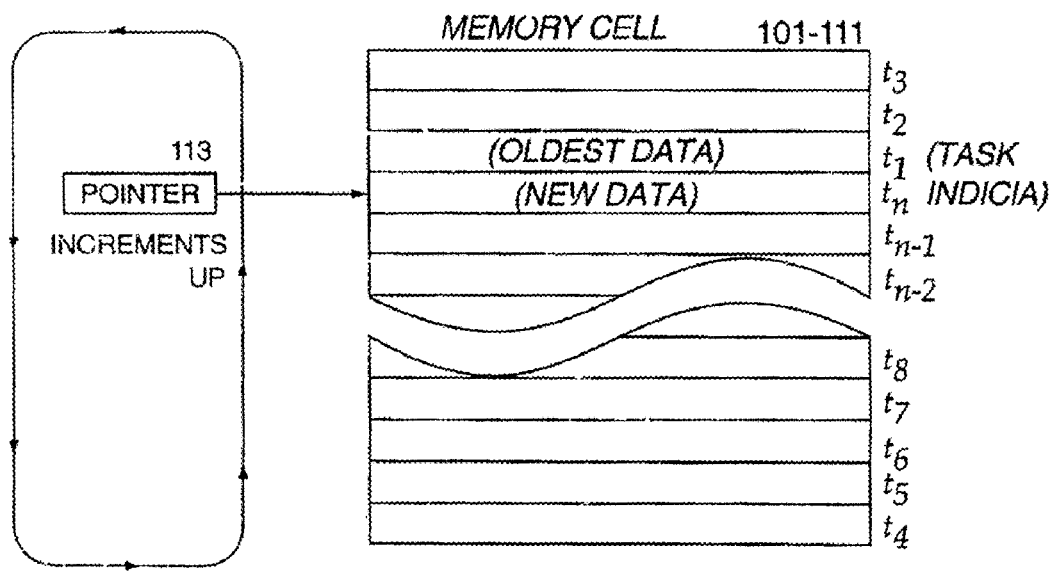
FIG. 5B is a schematic representation of one of the memories in the chronology memory of FIG. 5A.

Turning to FIGS. 5A and 5B, the RAM memory 47 of FIG. 2 includes the chronology memory 83 (see FIG. 2B) organized as illustrated. Data from each of the production-related sensors 67 is read either a minimum of or approximately four times a second and stored in a first memory cell 99. Two minutes worth of data is accumulated in the first memory cell 99—i.e., 480 data samples for each sensor 67. As the data becomes older, it is less likely to be helpful in diagnosing a failure mode or an extreme reading from one of the vital sign sensors 73. On the other hand, slow moving trends in the values of the data can be useful in a diagnosis. As the data ages, the chronology memory 83 retains smaller fractions of the originally sampled data. When the data is approximately 606 minutes old (as measured by vehicle operation time), it is no longer stored.

To accomplish the foregoing storage scheme for the data from the production-related sensor 67 and the vital sign sensors 73, a plurality of memory cells are cascaded as illustrated in FIG. 5A. As previously indicated, the first cell 99 stores each of the original data samples from the sensors, which are sampled at four (4) times a second. In a second memory cell 101, the oldest data from the first cell 99 is read two times a second. A third memory cell 103 reads the oldest data from the second cell 101 once a second. A fourth memory cell 105 reads the oldest data from the third cell 103 once every two seconds. A fifth memory cell 107 reads the oldest data from the fourth cell 105 once every four seconds. A sixth memory cell 109 reads the oldest data from the fifth cell 107 once every eight seconds. Finally, a seventh memory cell 111 reads the oldest data from the sixth cell 109 once every minute. As illustrated by FIG. 5B, each of the cells 99-111 employs a circulating pointer 113 that increments through the addresses of the cell to write new data over the oldest data, using well known programming techniques.

Figure 6A:
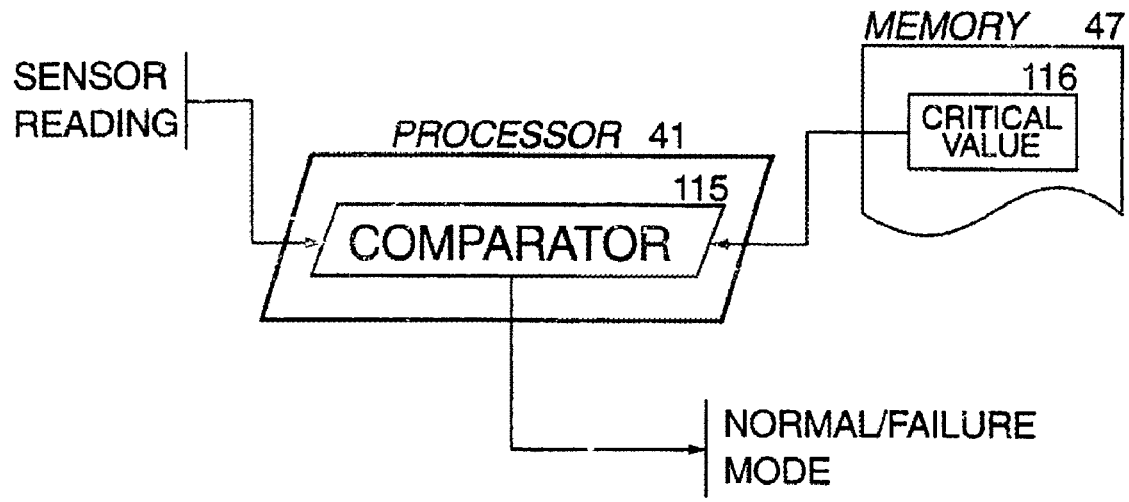
FIG. 6A is a state machine diagram for the diagnostic system of FIG. 2 illustrating the comparison of work-related sensor data with critical values for the vital sign data stored in memory for the purpose of identifying a failure mode of the vehicle in accordance with another aspect of the vehicle.
Figure 6B:
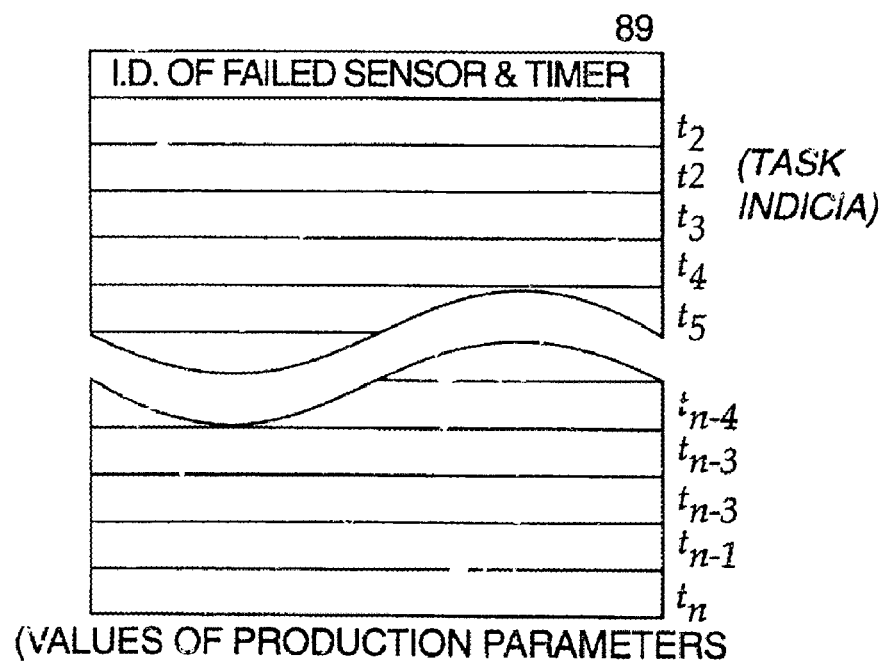
FIG. 6B is a memory map illustrating the format of a memory that stores the historical information accumulated by the chronology memory of FIG. 5A upon detection of a failure mode of the vehicle.

In keeping with the invention, the processor 41 is configured as a comparator 115 in FIG. 6A to compare the present value of one of the vital sign sensors 73 and a critical value 116 held in the RAM memory 47 that has been selected as being indicative of a poor state of health of the vehicle 11 and the component or subassembly monitored by the sensor. In response to the comparison, the processor 41 provides an output signal that indicates either that the sensor reading is within an acceptable or normal range or that the reading is at a critical state, which suggests that vehicle 11 is in a failure mode. The comparator 115 of FIG. 6A receives data inputs from each of the vital sign sensors 73, including the accelerometer 73L. If a failure mode is detected for any of the vital sign sensors 73, some or all of the historical data stored in the chronology memory 83 of FIGS. 2B and 5A is captured, correlated with the vital sign sensor whose output has reached a critical state and placed in the memory 89 of FIGS. 2A and 6B for future access by the user of the diagnostic system.

Separate from comparing each reading of the vital sign sensors 73 to a critical value, the processor 41 also determines whether the reading is one of the ten historically extreme readings. This comparison is intended to identify and track anomalies in the status of the state of health of the device monitored by the sensor. With the identification of each anomaly, an appropriate portion of the data in the chronology memory 83 is duplicated in the chronology memory 87 associated with the anomaly recorded as one of the ten greatest extremes. The collection of this data can be accessed by the user of the diagnostic system for taking corrective action (e.g., maintenance or changing driving habits) in order to avoid a failure mode of the vehicle 11. Of course, the data can also serve to supplement the data recorded by detection of a failure mode for the purpose of diagnosing the cause.

Figure 7B:
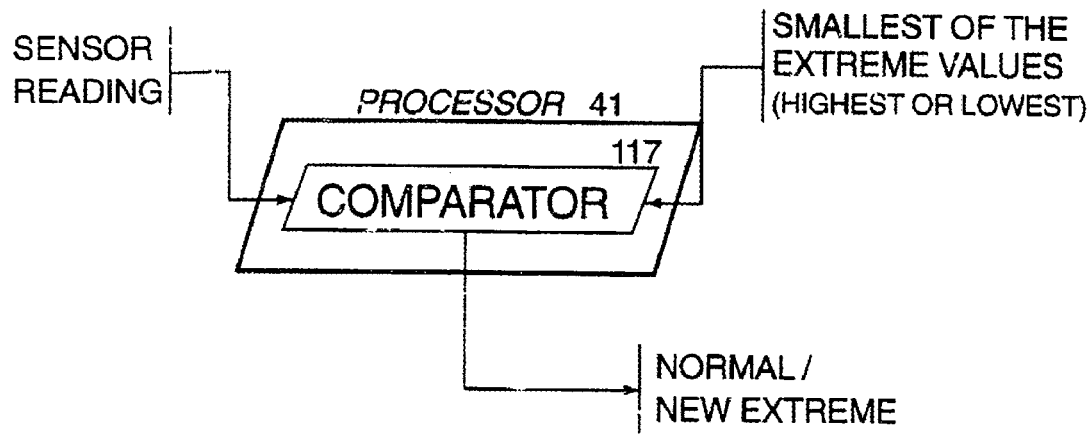
FIG. 7B is a schematic illustration of a memory stack of the historical 10 most extreme values for data from a vital sign sensor and a related memory for storing the chronology values of the production-related sensors at the time each extreme value occurred.
Figure 7B:
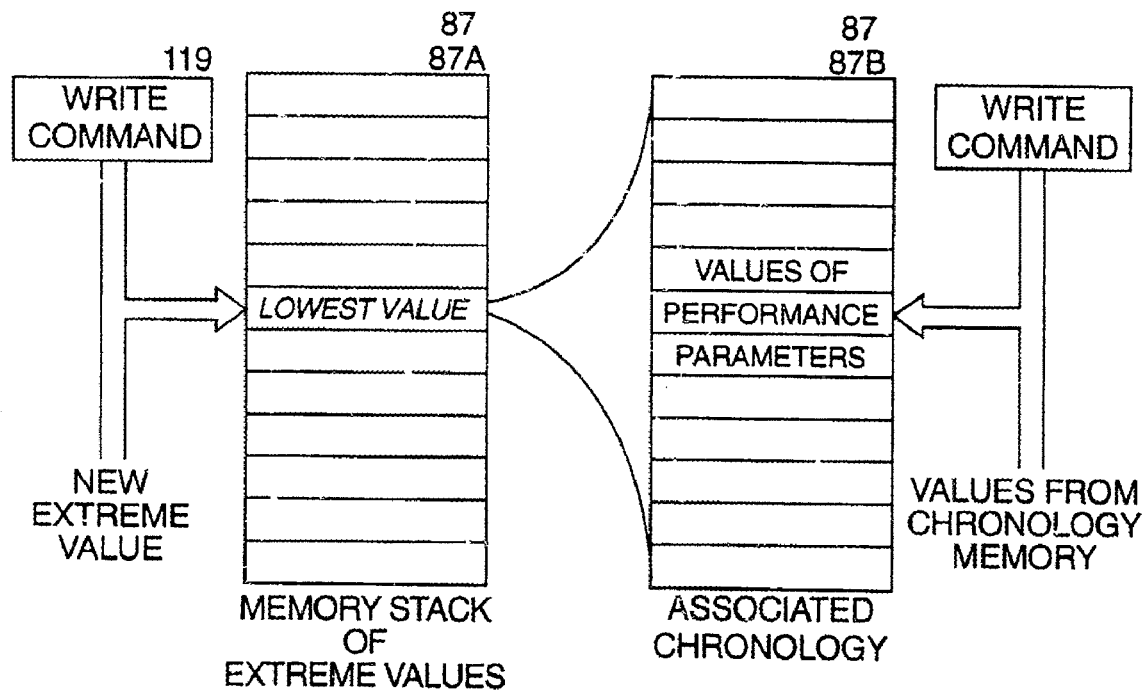

In FIG. 7A, the processor 41 is again configured as a comparator 117 to compare the present reading from one of the vital sign sensors 73 with the smallest of the ten extreme values held in the memory 87 in FIGS. 2B and 7B. If the comparison indicates the new reading is a greater extreme than the smallest extreme previously stored in the memory 87A of ten extremes, a write command 119 reads the new reading into the memory address of the old smallest extreme as suggested by FIG. 7B. Chronological data of the performance-related sensors 67 are duplicated in a set of memory addresses 87B associated with the memory location into which the new vital sign reading has been written.

FIG. 8 is a map of the various data screens that can be displayed by the display 61 of the diagnostic system. Each of the menus and its entries can be accessed by way of keystrokes to the keypad 59. In this illustrated embodiment of the invention, some of the data available from the menu is intended to be generally accessible, whereas the availability of other data is limited to those who know a password. Also, some of the menu items allow data to be changed or updated, while other menu items allow data to be displayed but not changed. All of the data can be sent to the printer 77 for printing. Because of limitations imposed by the size of the screen of the display 61, some of the menu items print to the printer 77 information in addition to that visualized on the display screen.

In keeping with the invention, the data of the menu items in the LEVEL 3 DIAGNOSTICS MENU are intended to identify anomalies in the operation of the vehicle 11 that aid in the diagnosing of a component or subassembly failure mode. The menu items of the LEVEL 3 DIAGNOSTICS MENU are accessed by way of keystrokes to the keypad 59 as described hereinafter in connection with FIGS. 9A-9C. The data for each of the menu items can be visualized on a screen of the display 61 or printed to the printer 77 as described hereinafter in connection with FIGS. 10A-10I and 12A-12B. The computer program of the Appendix includes menu items 1-12 of the LEVEL 3 DIAGNOSTICS MENU and items 1-32 of the LEVEL 2 SETUP MENU. Moreover, the computer program of Appendix A includes the production monitoring and displaying feature of the invention previously explained in connection with FIGS. 3 and 4. The failure mode diagnostic routine, however, of FIGS. 28 and 5-7 are not part of the computer program of Appendix A.

In the menu map of FIG. 8, items 13 through 16 of the LEVEL 3 DIAGNOSTICS MENU are the information contained in the memories 85, 87 and 89 of FIGS. 2B and 5-7. As will be appreciated by those skilled in vehicle systems, many components and subassemblies of the vehicle 11 have operating parameters that have a range of values that are normal and indicate a satisfying state of health. Often the range of values includes upper and lower limits. Therefore, the memory 87 of FIG. 2B is divided into two items 15 and 16 in the menu map of FIG. 8. Item 15 contains the ten (10) greatest extremes above an upper limit; whereas item 16 contains the ten (10) greatest extremes below a lower limit.

In the LEVEL 2 SETUP MENU, items 33 through 36 provide some of the additional critical values 116 of FIG. 6A. As will be readily apparent to those familiar with vehicle sensors of the type disclosed in the illustrated embodiment, additional critical values 116 may be required for programming beyond the four identified in items 33-36.

By accessing items 1-32 of the LEVEL 2 SETUP MENU, certain variables used by the computer program of the Appendix are input or updated. For example, in item 9, a value is entered for an acceptable percentage variance between the pressure reading from the pressure sensors 67K and an expected zero offset pressure. In a background subroutine not illustrated, the computer program of Appendix A compares the acceptable percentage variance and the actual variance between the pressure reading from each of the pressure sensors 67K and the expected zero offset pressure. A variance greater than the programmed acceptable variance is stored as an anomaly that can be viewed on the screen of the display 61 at item 5 "Leaking Sensor" of the LEVEL 3 DIAGNOSTICS MENU.

In another example of the data available from the diagnostic system of the invention, item 28 of the LEVEL 2 SETUP MENU is a maximum elapsed time allowed for a continuous reading from one of the pressure sensors 67K. In a background subroutine not illustrated, the computer program of Appendix A monitors the value of the reading from each of the pressure sensors 67K to determine if the reading remains unchanged for more than an amount of time that has been programmed in item 28 of the LEVEL 2 SETUP MENU. If the time period is exceeded, the reading is recognized as an anomaly that is placed in the RAM memory 47 for viewing by the user at item 3 of the LEVEL 3 DIAGNOSTICS MENU. In both of the foregoing examples, the data can be printed to the printer 77 as explained more fully hereinafter.

Although not discussed herein in detail, the computer program of Appendix A also includes other menus as suggested by the menu map of FIG. 8. In a MAIN MENU, the vehicle operator can change the operator identification, loading point and dump site and several other operating variables that may change during normal operation. The MAIN MENU also provides at item 8 for printing to the printer 77 the basic diagnostic data held in the RAM memory 47. At item 9 of the MAIN MENU, the other menus can be accessed if the user enters a correct password.

From item 9 of the MAIN MENU, the system enters a LEVEL 1 MENU as illustrated in FIG. 8 and provides a screen at the display 61 of menu items 1-6. Each of these menu items is a port to other menus as suggested by FIG. 8. Menu items 1, 2 and 3 are freely accessible without any additional security passwords. The menus that can be accessed from items, 1, 2 and 3 of the LEVEL 1 MENU allow the user to change names in memory (NAME SETUP MENU), to display results of a self-diagnostics routine for the system (DIAGNOSTICS MENU) and to change or update programmable values for certain basic functions (LEVEL 1 SETUP).

Figure 9A:
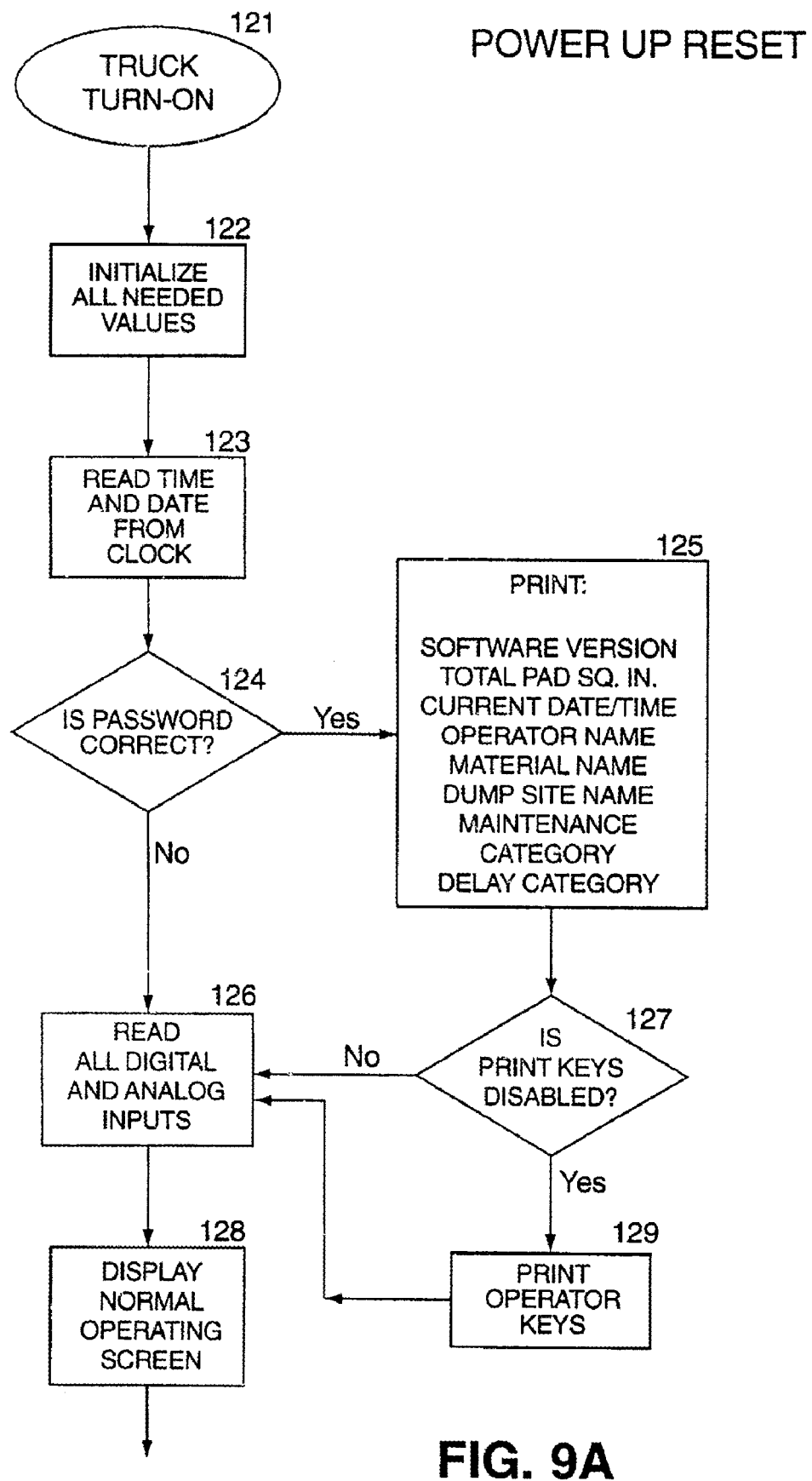
FIGS. 9A-9C illustrate a flow diagram for navigating through the menu map of FIG. 8 for displaying various diagnostic information held in a memory according to the invention.
Figure 9B:
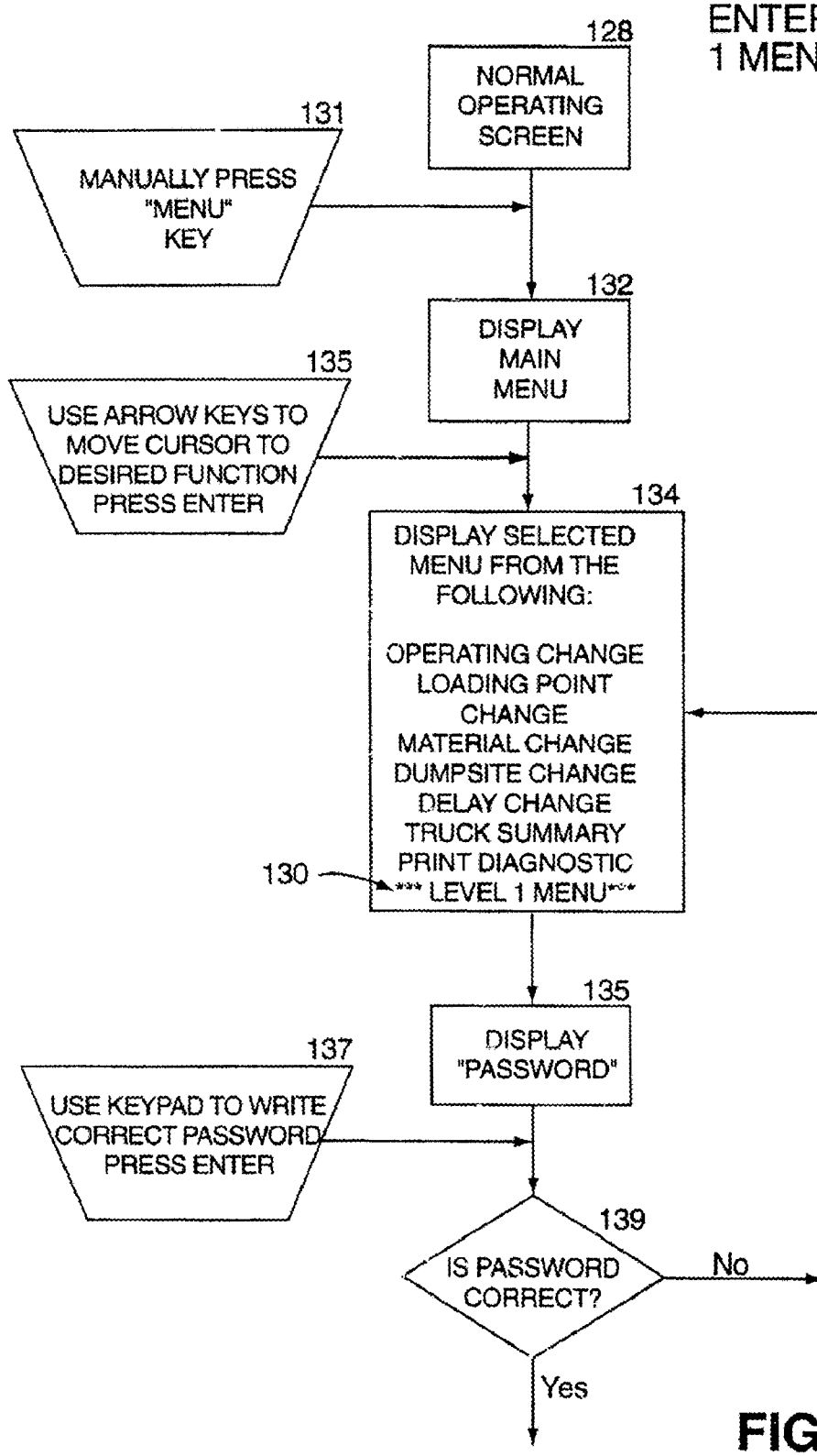
Figure 9C:
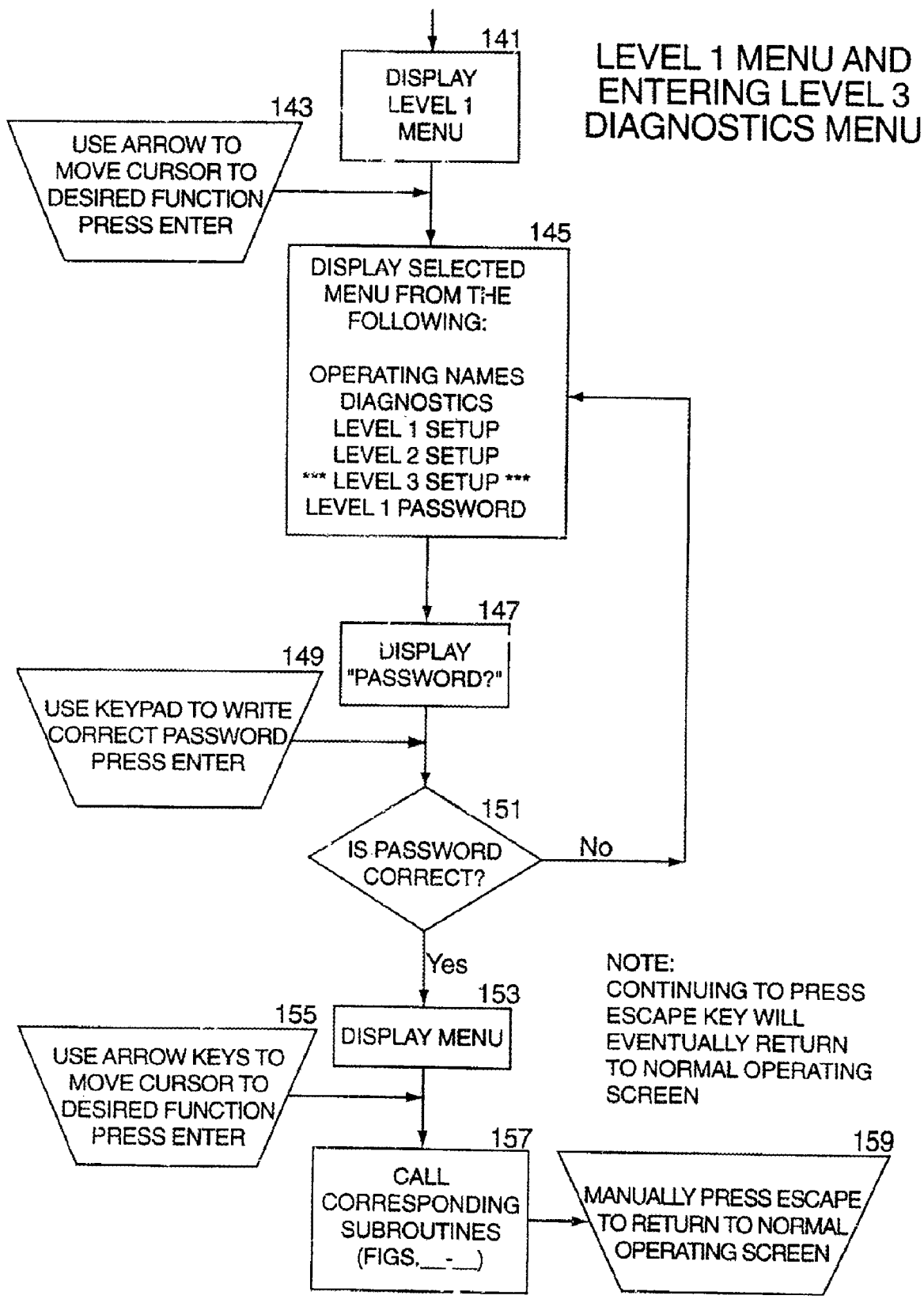

Turning now to the flow diagrams and referring first to the flow diagrams of FIGS. 9A-9C, a number of subroutines are executed by the diagnostic system in accordance with the menu system mapped in FIG. 8. The flow diagram of FIGS. 9A-9C is an exemplary navigation through the menu system that ends in the display of the menu items associated with the LEVEL 3 DIAGNOSTICS menu, which are the menu items that contain the data for diagnosing anomalies in the task-related performance parameters of the vehicle (relative to vital signs) in keeping with the invention.

After power has been applied to the diagnostics system when the vehicle 11 is turned on in step 121, all variable values of the diagnostic system are initialized in step 122. As part of the startup procedure, the date and time is read from the time clock 40 in step 123. If the printer 77 is enabled as determined in step 124, the previously programmed values of several variables are identified in a printout from the printer as described in step 125. In step 127, the system looks to determine whether the keypad 59 is enabled. The system prints at the printer 77 the following printed message at step 129:

```
OBDAS 6816 VER 0194 -PAD SQ. IN.    80
TRUCK LAST RUN 01/14/94 13:58:12
TRUCK STARTED 02/02/94 07:44:12
TIME OFF 21 DAY 17 HRS 46 MIN 44 SEC
OPERATOR:            READY LINE
LOADING POINT:       103
MATERIAL:            INDUSTRIAL
DUMP SITE:           NORTH LAND FILL
MAINT CATEGORY:      RELEASED TO PROD
DELAY CATEGORY:      NO DELAY
************************************************
       IN NORMAL TRUCK OPERATION
       THE ONLY KEYS USED ARE:

MENU            TO GET TO MAIN MENU
ARROW DOWN      MOVE DOWN ONE LINE
ARROW UP        MOVE UP ONE LINE
ENTER           SELECT CURRENT LINE
ESCAPE          RETURN TO PREVIOUS SCREEN
```

From steps 127 or 129, the system returns to step 126 where the values of all of the various digital and analog devices are read.

After the start sequence of FIG. 9A has been completed, the system displays a "normal operating screen" at step 128 in FIG. 9B. The screen of the display 61 contains four (4) lines of text. An example of the normal operating screen is as follows:

```
08:00:04                        02/05/94
PAYLOAD:                        50.0
OPER:                           JIM SMITH
        (Line 4 scrolls the following information)

LOADING POINT:          PIT ONE
MATERIAL:               SHOT ROCK
DUMPSITE:               CRUSHER TWO
MAINTENANCE CATEGORY:   RELEASED TO PROD
DELAY CATEGORY:         NO DELAY
```

Line 1 of the foregoing sample displays the present time and date. Line 2 displays the weight of the present payload. Line 3 displays the identity of the current vehicle operator. Line 4 scrolls across the screen information regarding the designated loading point, the material to be loaded, the designated dump site, the maintenance category and the delay category. In the example, the maintenance category is identified as "RELEASED TO PROD," which means that the vehicle is released for use in ordinary production. The DELAY CATEGORY is a data field to identify reasons for any delay of the vehicle in normal operation such as loading equipment being broke down. This applies to any delay other than maintenance requirements such as, for example, a flat tire that must be repaired.

From the normal operating screen, the menu system described in connection with FIG. 8 can be accessed by pressing the "MENU" key. Pressing the "ESCAPE" key returns the display 61 to its normal operating mode as described above. In response to a keystroke to the MENU key the display 61 will list the first three (3) items in the MAIN MENU. Since the screen of the display 61 has only four (4) lines, to see the entire MAIN menu, it is necessary to use the arrow keys (i.e., ↑ and ↓) to scroll the display 61. A cursor 130 (see FIG. 9B at step 134) is controlled by the arrow keys to indicate the current item that can be selected by a keystroke to the "ENTER" key. In the drawings, the cursor is illustrated as a series of three asterisks (i.e., ***). Preferably, the position of the cursor is indicated by a flashing icon in a conventional manner. To exit the MAIN MENU, a simple keystroke to the "ESCAPE" key is all that is necessary. In general, a keystroke to the "ESCAPE" key will always take the user back to the previous screen of the display 61. Repeated keystrokes to the "ESCAPE" key will eventually return the system to display the normal operating screen.

Returning to the flow diagram of FIG. 9B, from the normal operating screen in step 128, a keystroke to the MENU key in step 139 changes the display 61 from the normal screen to a MAIN MENU screen display in step 132. In step 134, the first three (3) entries in the MAIN MENU are initially displayed. The remaining items in the MAIN MENU are viewed by scrolling the screen using the arrow keys to move the cursor 130 to the desired item in the MAIN MENU as set forth in step 135.

Once the cursor 130 has been moved to the desired menu item and the ENTER key has been pressed, the display 61 may prompt the user to enter a password. For example, in the flow diagram of FIG. 9B, the asterisks (***) in step 134 indicate that the cursor 130 has been moved to the menu item identified as LEVEL 1 MENU. As indicated in the menu map of FIG. 8, access to the LEVEL 1 MENU requires entry of a password. In the flow diagram of FIG. 9B, step 135 assumes that the LEVEL 1 MENU has been selected by a keystroke to the ENTER key.

In step 137, the user of the system enters a password by way of keystrokes to the keypad 59, which is completed by pressing the ENTER key. In step 139, if the password is one that is recognized by the system, the display then changes to a display of the first three entries of the LEVEL 1 MENU. Otherwise, the display screen continues to prompt the user to enter a correct password (the screen of the display 61 is "Password: XXXXXXX").

From the LEVEL 1 MENU displayed in step 141, the user of the system uses the arrow keys to move the cursor 130 to the desired menu item. When the cursor 130 is adjacent the desired menu item, a keystroke to the ENTER key selects that item as generally indicated by steps 143 and 145. Like items on the MAIN MENU, some of the items in the LEVEL 1 MENU require entry of a password before the system will allow access to the user. As suggested by the menu map of FIG. 8, the LEVEL 2 SETUP and the LEVEL 3 DIAGNOSTICS in the LEVEL 1 MENU both require entry of a password before the user can gain access to these menu items. After the cursor 130 has been moved to the desired item or function (e.g., the LEVEL 3 DIAGNOSTICS in step 145), the system prompts the system user to enter a password in step 147. In step 147, the user inputs the password and presses the ENTER key. If the password is correct in step 151, the selected menu item is displayed in step 153. If the password is incorrect, the screen displays "PASSWORD: XXXXXXX".

In the example illustrated in the flow diagram of FIG. 9C, the selected menu item from the LEVEL 1 MENU is the LEVEL 3 DIAGNOSTICS. In step 153, the menu listing of the items available in the LEVEL 3 DIAGNOSTICS MENU is displayed for selection by the user. In step 155, the user moves the cursor by way of keystrokes to the arrow keys in order to select the desired menu item. In step 157, the following menu items are available for display:

| | LEVEL 3 DIAGS |
|---|---|
| 1 | HIGHEST PAYLOADS |
| 2 | HIGHEST SPIKES |
| 3 | STUCK TRANSDUCER |
| 4 | BODY EMPTY PSI |
| 5 | LEAKING SENSOR |
| 6 | LAST 5 NEUTRALS |
| 7 | LAST 5 REVERSES |
| 8 | LAST 5 DUMPS |
| 9 | OBDAS SERIAL # |
| 10 | OBDAS PART # |
| 11 | CLEAR DIAGNOSTICS |
| 12 | LEVEL 3 PASSWORD |
| 13 | VITAL SIGNS |
| 14 | VEHICLE CRASH |
| 15 | 10 HIGHEST VITAL SIGNS |
| 16 | 10 LOWEST VITAL SIGNS |

This menu, like all the other menus, actually displays only four (4) of the items at a time since the display 61 in the illustrated embodiment has only four lines of text available. Each of the sixteen items identified in the above example of the LEVEL 3 DIAGNOSTICS MENU provides diagnostic data to the display 61 when it is selected by the user by moving the cursor 130 to a position adjacent the item as described previously in connection with the selection of other menu items.

In step 157, each of the subroutines for the menu items identified in the LEVEL 3 DIAGNOSTICS MENU may be executed. As previously mentioned, the user can exit this menu and retrace his/her way through the menu map by keystrokes to the ESCAPE key as suggested by step 159. The following is a brief description of the diagnostic data avail-able from each of the items 1-9 and 11 in the example given above of the LEVEL 3 DIAGNOSTICS MENU with reference to the flow diagrams in FIGS. 10A-10I. Items 13 through 16 are described in connection with the flow diagrams of FIGS. 12A and 12B.

Figure 10A:
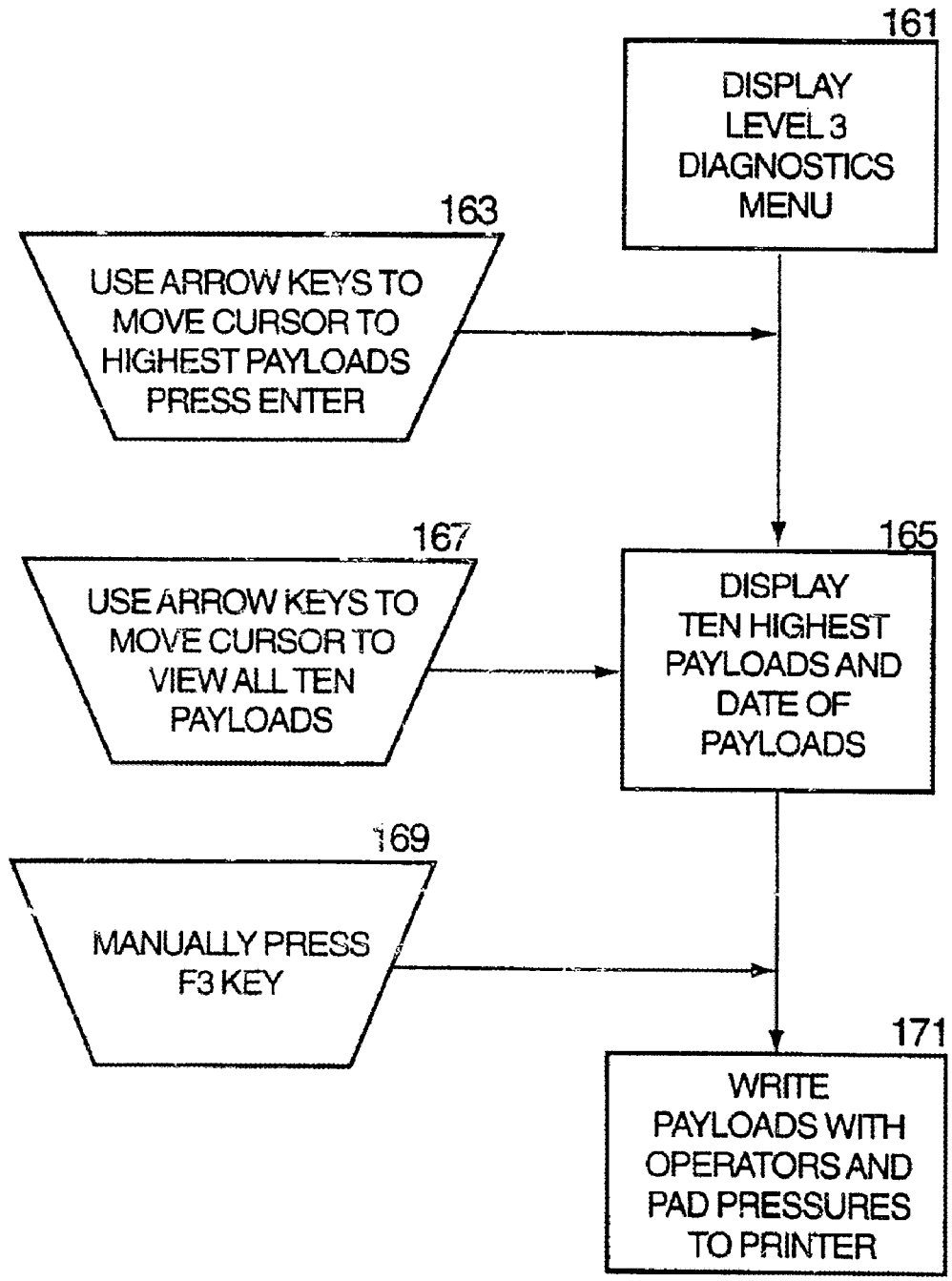
FIGS. 10A-10I are flow diagrams for displaying some of the diagnostic information stored in memory.

FIG. 10A—Highest Payloads

The screen for this menu item shows the ten highest payloads and the date of the payload. In FIG. 10A, step 161, the LEVEL 3 DIAGNOSTICS MENU is displayed. Placing the cursor 130 adjacent the item identified as HIGHEST PAYLOADS, and pressing the ENTER key in step 163 causes the ten highest payloads and the dates of the payloads to be displayed at step 165. The information is scrolled over the screen of the display 61 by moving the cursor 130 in step 167.

The following is an example of the screen:

| | LOAD | DATE |
|---|---|---|
| 1 | 80.0 | 02/05/94 |
| 2 | 73.0 | 02/07/94 |
| 3 | 81.2 | 02/08/94 |

To print the data to the printer 77 in step 171, step 169 requires the F3 key be pressed. The printed data includes additional information such as the name of the operator and the time of day when the highest payload was recorded.

Printing this information at step 171 outputs the payloads, the operator, and the pressures of the pressure sensors 67K for that payload. A sample of the printed report is reproduced below.

| | *TEN HIGHEST PAYLOADS* | | | |
|---|---|---|---|---|
| 1. | 02/05/94 | 08:13 | 80.0 TONS | |
| | OPERATOR: | JIM SMITH | | |
| | PRESSURES: | 223.6 | 230.9 | 229.5 227.9 |
| 2. | 02/05/94 | 08:25 | 80.0 TONS | |
| | OPERATOR: | JEFF JONES | | |
| | PRESSURES: | 231.2 | 232.1 | 228.7 230.6 |

Figure 10B:
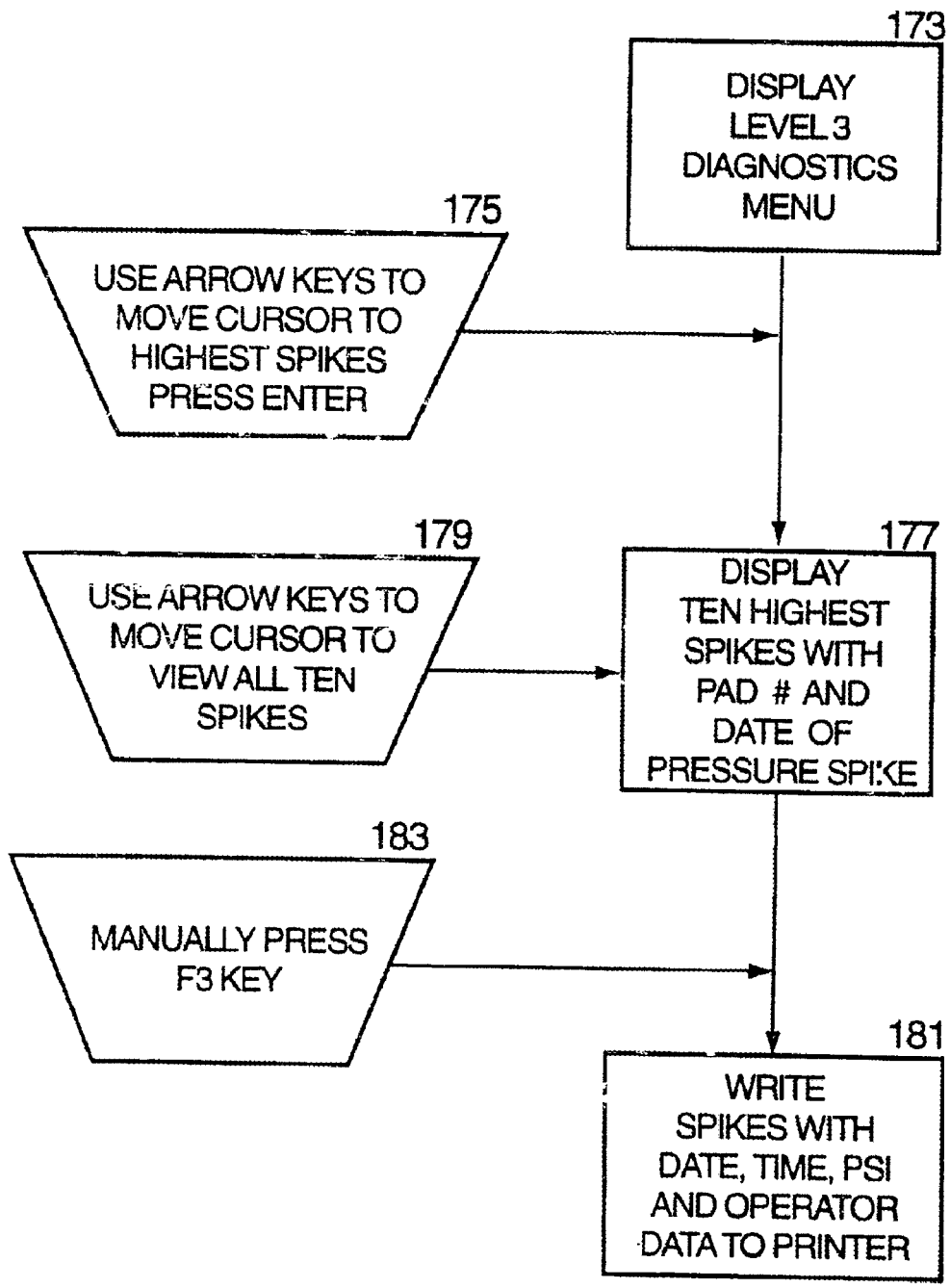

FIG. 10B—Highest Spikes

The screen of this menu item lists the ten highest haulroad spikes along with the number of the pressure sensor in which the spike occurred and the date of the spike.

From the screen of the LEVEL 3 DIAGNOSTICS MENU in step 173, the user of the system moves the cursor 130 in step 175 to select item 2 in the menu, which is the HIGHEST SPIKES SUBROUTINE. In response to a keystroke to the ENTER key in step 175, the system moves to step 177 and displays on the screen of the display 61 the first four of the ten highest spikes. By using the arrow keys in step 179, the remaining six spikes can be scrolled into view.

An example of the display screen is as follows:

| | PAD | PSI | DATE |
|---|---|---|---|
| 1 | 3 | 270.0 | 02/05/94 |
| 2 | 4 | 258.6 | 02/05/94 |
| 3 | 1 | 253.9 | 02/05/94 |

In step 183, a keystroke to the F3 key will print at step 181 the top ten spikes with date, time, PSI and operator data.

Figure 10C:
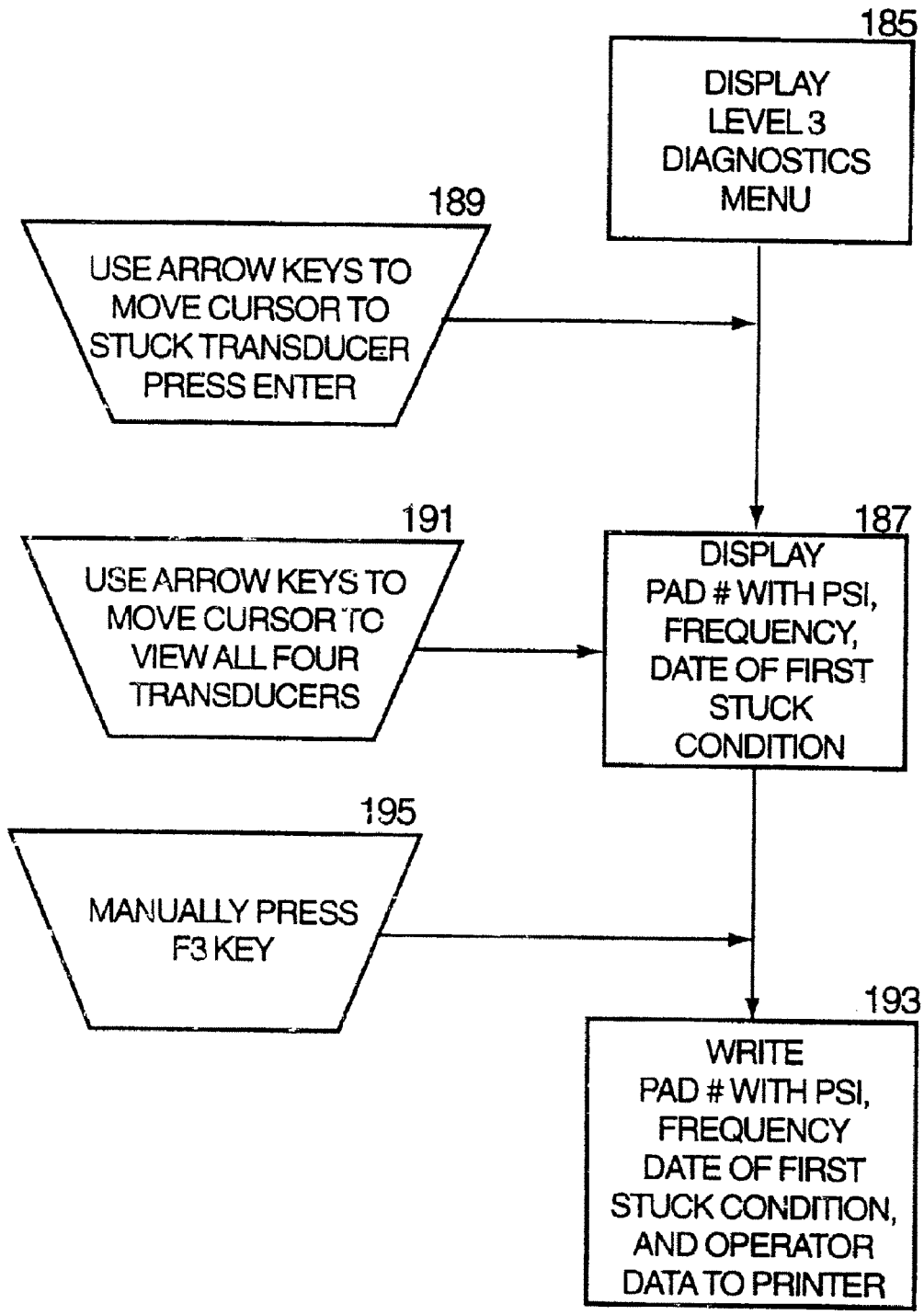

FIG. 10C—Stuck Transducer

The screen of this menu item displays the number of times each transducer of the pressure sensors 67 K has been stuck along with the pressure (psi) at which the transducer was stuck and the date of the first time it was stuck. This subroutine identifies whether a transducer is stuck (i.e., has been over-pressured to the point it will not return to its normal zero-load signal). As explained more fully hereinafter, if the pressure signal from one of the transducers is expected to be the zero offset output signal, then after a set number of seconds of a high reading after the vehicle body has dumped, the system considers the pressure transducer is stuck at a point above the offset previously recorded for the empty body condition.

At item 28 of the LEVEL 2 SETUP MENU, a pressure has been programmed or a transducer output signal has been programmed as a critical condition that must be exceeded for this stuck delay condition to be recorded.

By selecting item 3 of the LEVEL 3 DIAGNOSTICS MENU in steps 185 and 189, the screen of the display 61 changes to the first four values of the STUCK TRANSDUCER SUBROUTINE. The screen can be scrolled in step 191 to view all of the data.

The screen of the display 61 for this menu item is very similar to the highest payload and spike subroutines of FIGS. 10A and 10B, respectively, in that it will display the number of the pressure sensor and its associated transducer, the pressure at which the transducer is stuck (psi), the number of times the stuck condition has occurred and the date the first stuck condition occurred. The following is an example.

| PAD | PSI | FREQ. | DATE |
|---|---|---|---|
| 1 | 267.9 | 1 | 02/04/94 |
| 2 | 267.2 | 1 | 02/04/94 |
| 3 | 264.3 | 1 | 02/05/95 |

Printing this information to the printer 77 in steps 193 and 195 will output this data along with the name of the operator who was driving when the first stuck condition occurred. A sample of the printed report is as follows:

| PAD #1 | | | |
|---|---|---|---|
| OPER: | JIM SMITH | INDICATED | 1 TIMES |
| | | PAD #2 | |
| OPER: | JIM SMITH | INDICATED | 1 TIMES |
| | | PAD #3 | |
| OPER: | JIM SMITH | INDICATED | 1 TIMES |

Figure 10D:
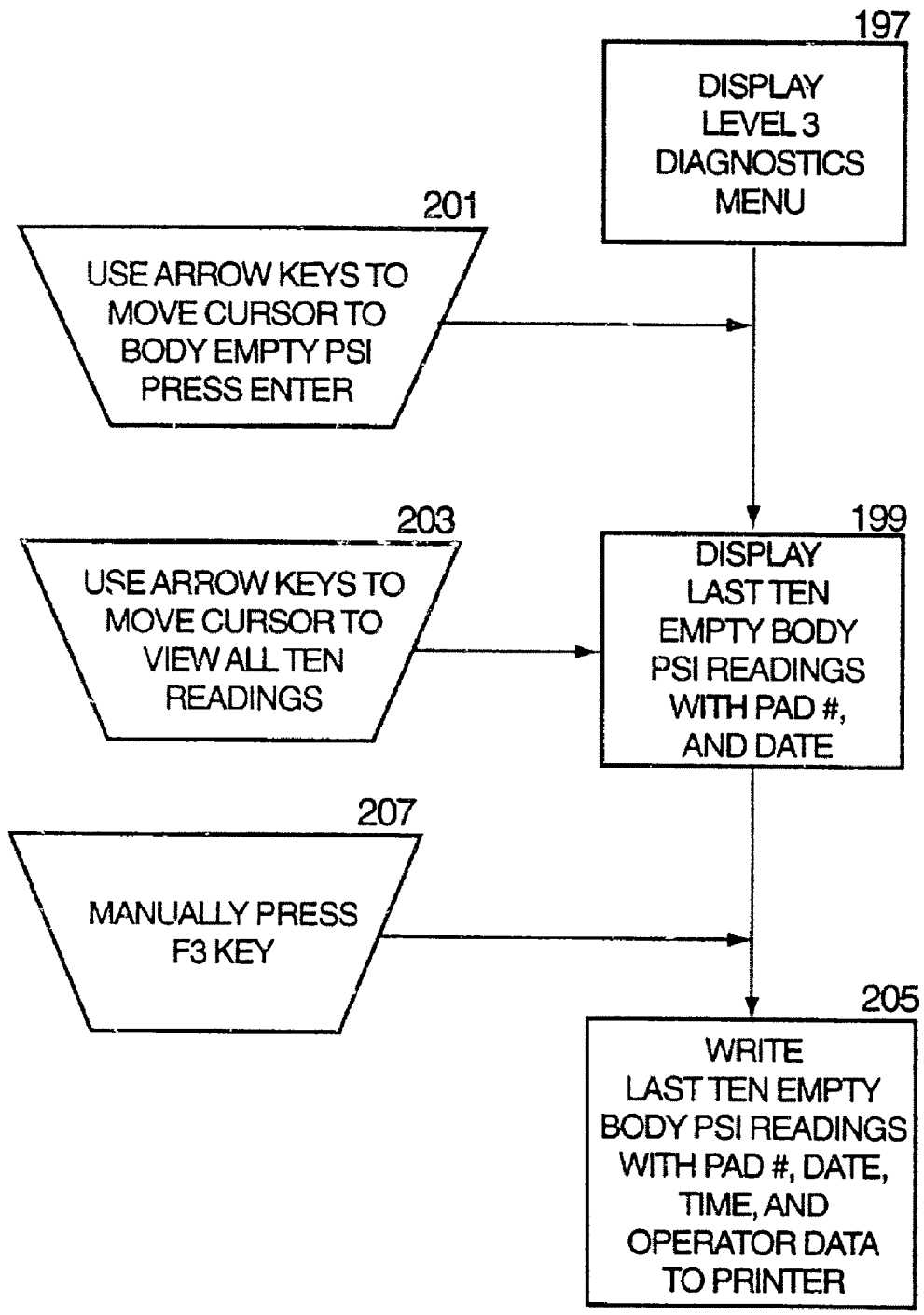

FIG. 10D—Body Empty (PSI)

The display screen for this menu item shows the last ten pressure readings for an empty body condition, along with the date of the readings. The first reading is the most recent. A new reading is recorded after each dump. Printing this information out will also give time and operator data.

From the LEVEL 3 DIAGNOSTICS MENU in step 197, the cursor 130 is moved by the arrow keys at step 201 to select item 4, the BODY EMPTY PSI SUBROUTINE. The first four readings are displayed on the screen of the display 61 at step 199 and the remaining readings can be scrolled into view by using the arrow keys in step 203.

Unless there is a haulback condition (i.e., material retained in the dump body after a dump) or something else that has added material to the body, this empty body condition should not vary. If it does vary, it is indicative of a problem with the load sensors. By looking at the change in time of the empty body pressure readings, a leaking load sensor can be diagnosed and the time it first began to leak can be identified. The following is an example of the data appearing on the screen of the display 61.

| PSI | 1 | | 01/14/94 |
|---|---|---|---|
| #1: | 46.5 | #3: | 6.6 |
| #2: | 19.2 | #4: | 46.3 |

In steps 205 and 207 printing the data in this menu item to the printer 77 includes the screen data with a date, time and operator name. A sample of the printed report is as follows:

| 1. | 01/14/94 | 13:57:54 | | |
|---|---|---|---|---|
| | OPER: | JIM SMITH | | |
| | PAD #1: | 46.5 | PAD #3: | 6.6 |
| | PAD #2: | 19.2 | PAD #4 | 46.3 |
| 2. | 01/14/94 | 13:56:14 | | |
| | OPER: | JIM SMITH | | |
| | PAD #1: | 34.8 | PAD #3 | 1.5 |
| | PAD #2: | 13.7 | PAD #4 | 35.6 |

Figure 10E:
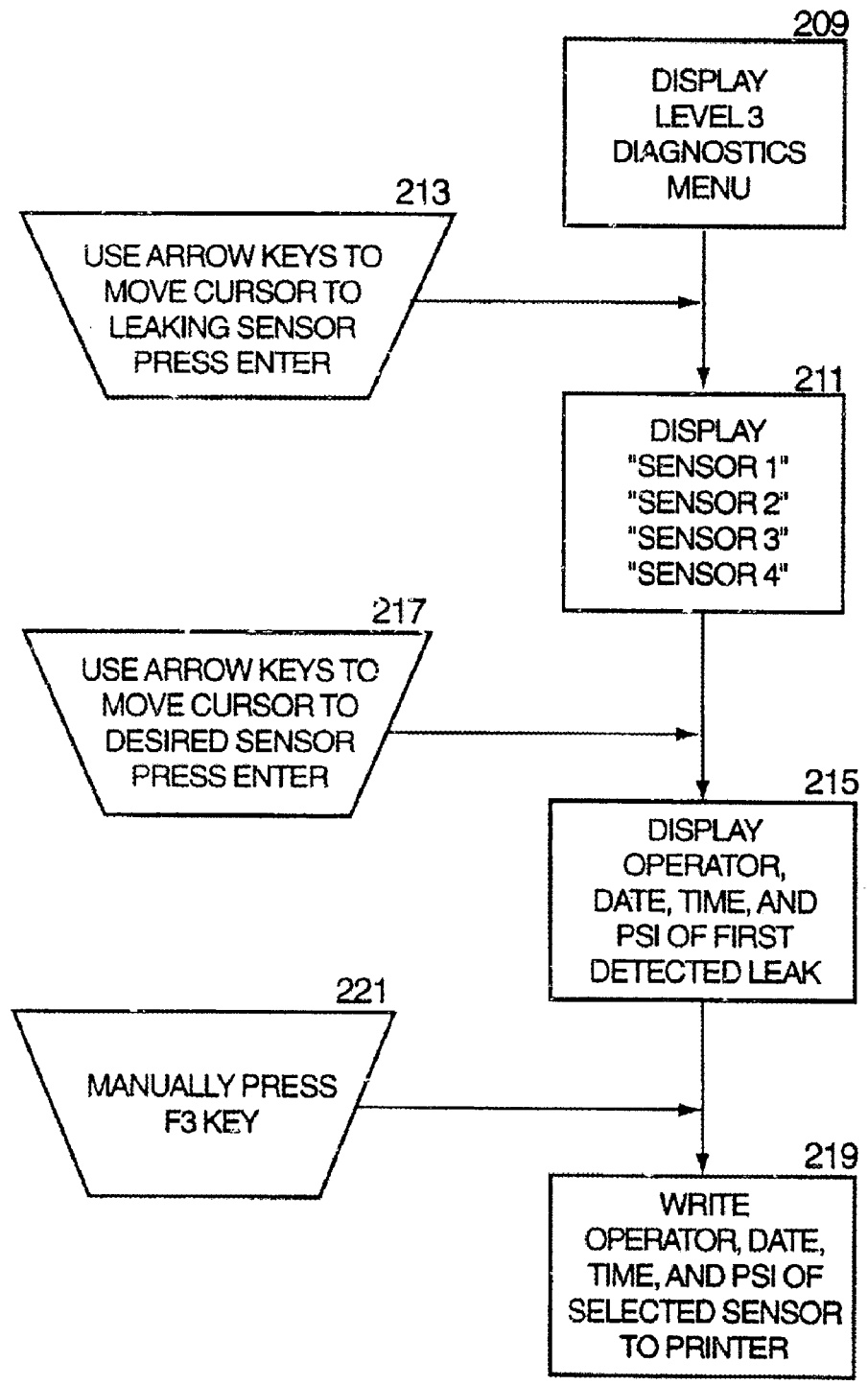

FIG. 10E—Leaking Sensor

The screen for this menu item shows leaking sensor data for each of the pressure sensors. The screen identifies whether there are any leaking sensors and the date and time the sensors first began to leak. The following is an example of a screen for this menu item.

| 1. | 02/05/94 | 10:55:54 |
|---|---|---|
| | 2.2 PSI | |

Whenever the vehicle is turned on, the diagnostic system checks the load sensors for leaks, provided the vehicle is in neutral and the body 13 is down as indicated by a low dump signal from the dump sensor.

Thereafter, a reading of the dump sensor 67L is taken after the body 13 is lowered and the vehicle is shifted into forward.

When this menu item is selected by way of a keystroke to the ENTER key in steps 209 and 213, the screen on the display 61 displays a list of the pressure sensors 67K as illustrated in step 211 of FIG. 10E. Using the arrow keys to move the cursor 130, the user selects one of the sensors in the list and again presses the ENTER key at step 217, which causes the display to change to the screen of step 215. This screen shows when the pressure of the selected sensor dropped below the programmed value for the offset zero pressure after a dump. The pressure is recorded in an address location of the RAM memory 47 when it drops below the programmed percentage. The percentage is programmed in the LEVEL 2 SETUP MENU (see FIG. 8).

Printing the information outputs the leaking sensor data for the selected one of the sensors 67K plus additional information available from the system's memory. A sample of the printed report is as follows:

| | | |
|---|---|---|
| SENSOR # 1 | | |
| 02/05/94 | | 12:16:04 |
| OPER: | | JIM SMITH |
| PRESSURE READING: | | 2.2 PSI |

Figure 10F:
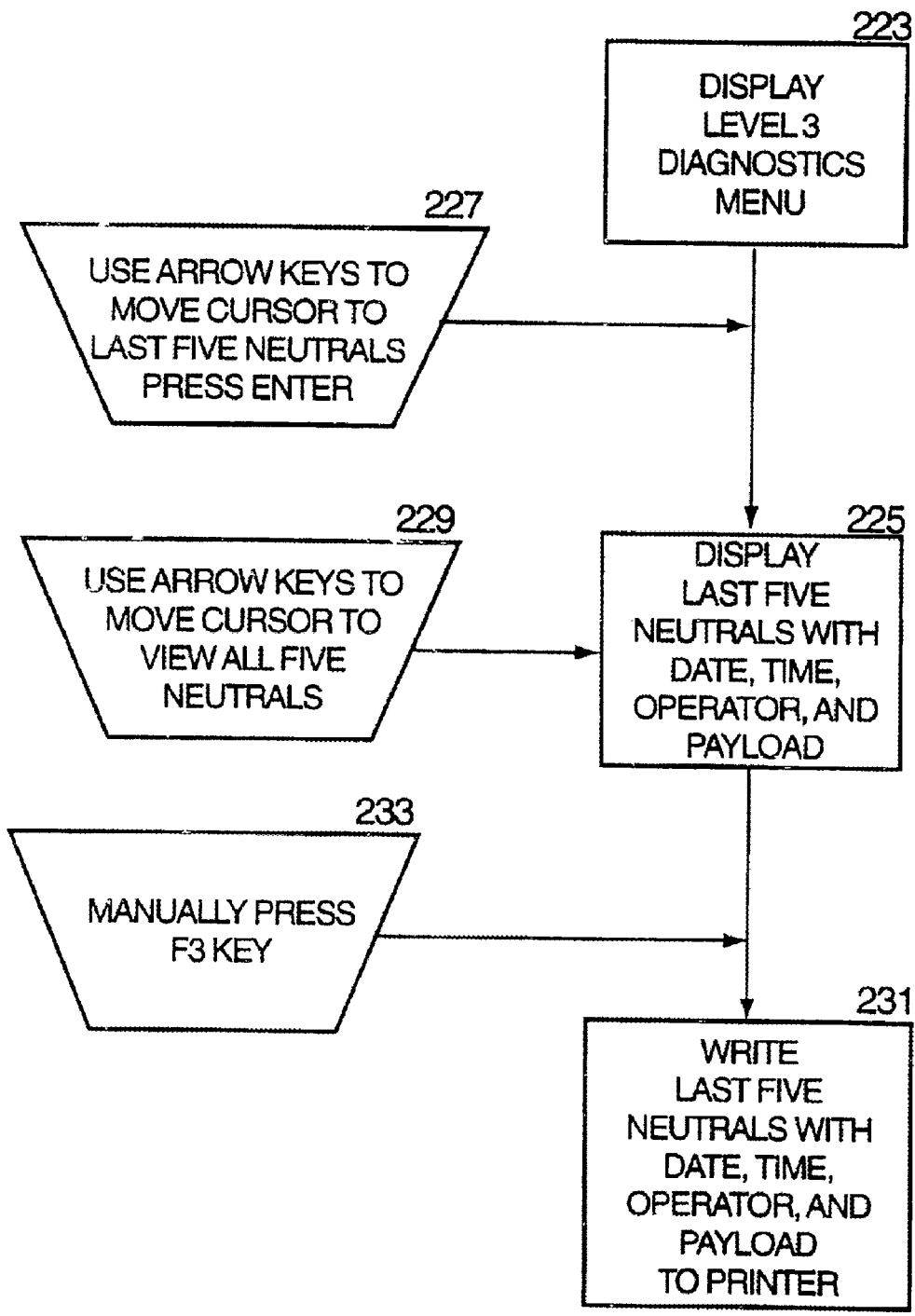

FIG. 10F—Last 5 Neutrals

Selection of this menu item displays the five most recent shifts into neutral. The date, time, payload and operator are also displayed. Working from the LEVEL 3 DIAGNOSTICS MENU in step 223, the screen of the display 61 changes in steps 227 and 225 to show when the last five neutrals occurred, the date, the time, the operator and the amount of the payload.

This is one method of verifying signal integrity of the neutral signal. If neutrals suddenly stopped at a certain point in time, then going back to that point in time determines what may have caused those neutral signals to stop—e.g., whether a wire was disconnected, a component failed or the like.

An example of the screen for this menu item is shown below.

| | |
|---|---|
| 02/05/94 | 10:50:22 |
| OPER: | JIM SMITH |
| WEIGHT: | 84.4 TONS |

A sample of the printed report produced by step 231 in response to a keystroke to the F3 key in step 233 of FIG. 10F is as follows:

| | | | |
|---|---|---|---|
| 1. | 02/05/94 | 10:55:54 | 78.5 TONS |
| | OPER: | JIM SMITH | |
| 2. | 02/05/94 | 10:50:22 | 84.4 TONS |
| | OPER: | JIM SMITH | |
| 3. | 02/05/94 | 10:48:10 | 40.4 TONS |
| | OPER: | JIM SMITH | |

Figure 10G:
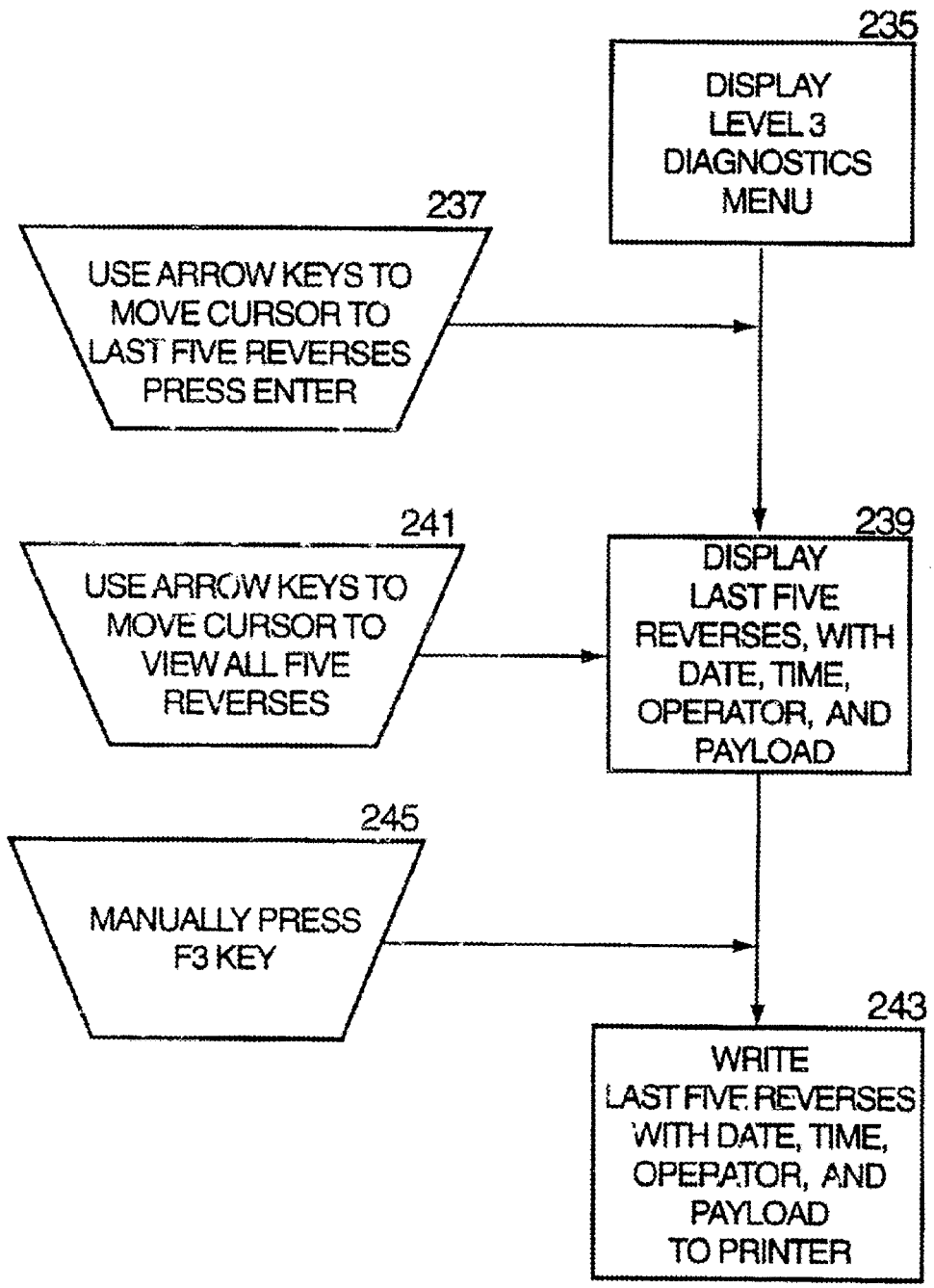

FIG. 10G—Last 5 Reverses

The screen of this menu item displays the five most recent shifts into reverse. In steps 235 and 237, this menu item is selected from the screen of the LEVEL 3 DIAGNOSTICS MENU by moving the cursor 130 to item 7, which is the LAST FIVE REVERSES SUBROUTINE. In step 239 the date, time, payload and operator are displayed on the screen to identify the event. The following is an example of a screen.

| | |
|---|---|
| 02/05/94 | 11:10:45 |
| OPER: | JIM SMITH |
| WEIGHT: | 78.5 TONS |

By using the arrow keys in step 241, all of the data can be scrolled into view on the screen of the display 61.

A sample of the printed report from steps 243 and 245 is as follows:

| | | | |
|---|---|---|---|
| 1. | 02/05/94 | 11:10:45 | 78.5 TONS |
| | OPER: | JIM SMITH | |
| 2. | 02/05/94 | 10:58:21 | 75.3 TONS |
| | OPER: | JIM SMITH | |
| 3. | 02/05/94 | 10:50:17 | 80.2 TONS |

Figure 10H:
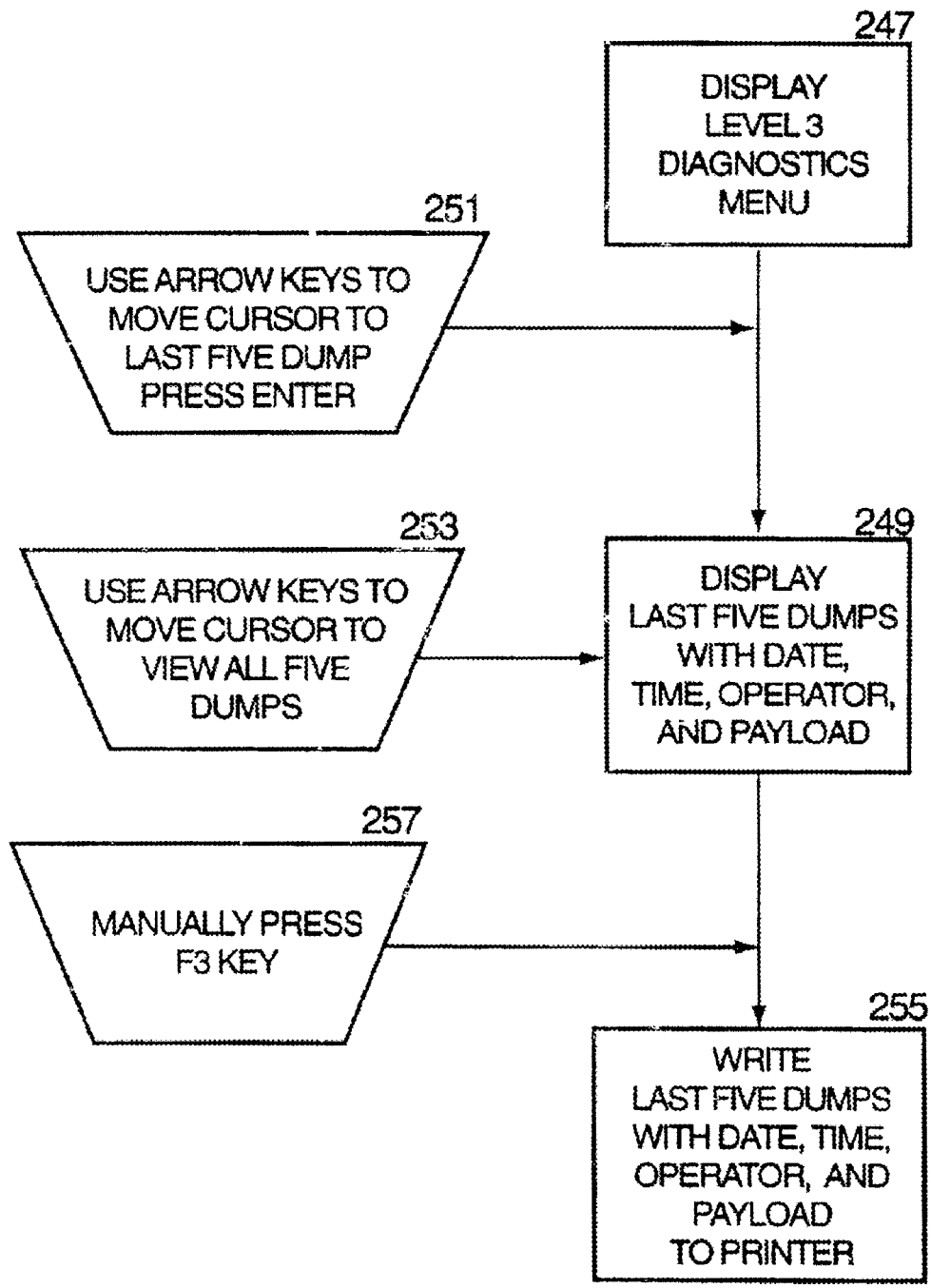

FIG. 10H—Last 5 Dumps

The screen of this menu item displays the five most recent dump events in step 249. The date, time, payload and operator are also displayed in step 249.

From the screen of the LEVEL 3 DIAGNOSTICS MENU in step 247, the user moves the cursor 130 in step 251 to select item 8, which is the LAST FIVE DUMPS SUBROUTINE. In step 253, the data is scrolled into view using the arrow keys.

The following is an example of a screen.

| | |
|---|---|
| LAST DUMP: | 1 |
| 02/05/94 | 11:03,28 |
| OPER: | JIM SMITH |
| WEIGHT: | 79.8 TONS |

A sample of the printed report produced in step 255 and 257 is as follows:

| | | | |
|---|---|---|---|
| 1. | 02/05/94 | 11:03:29 | 79.8 TONS |
| | OPER: | JIM SMITH | |
| 2. | 02/05/94 | 10:48.37 | 78.4 TONS |
| | OPER: | JIM SMITH | |

Figure 10I:
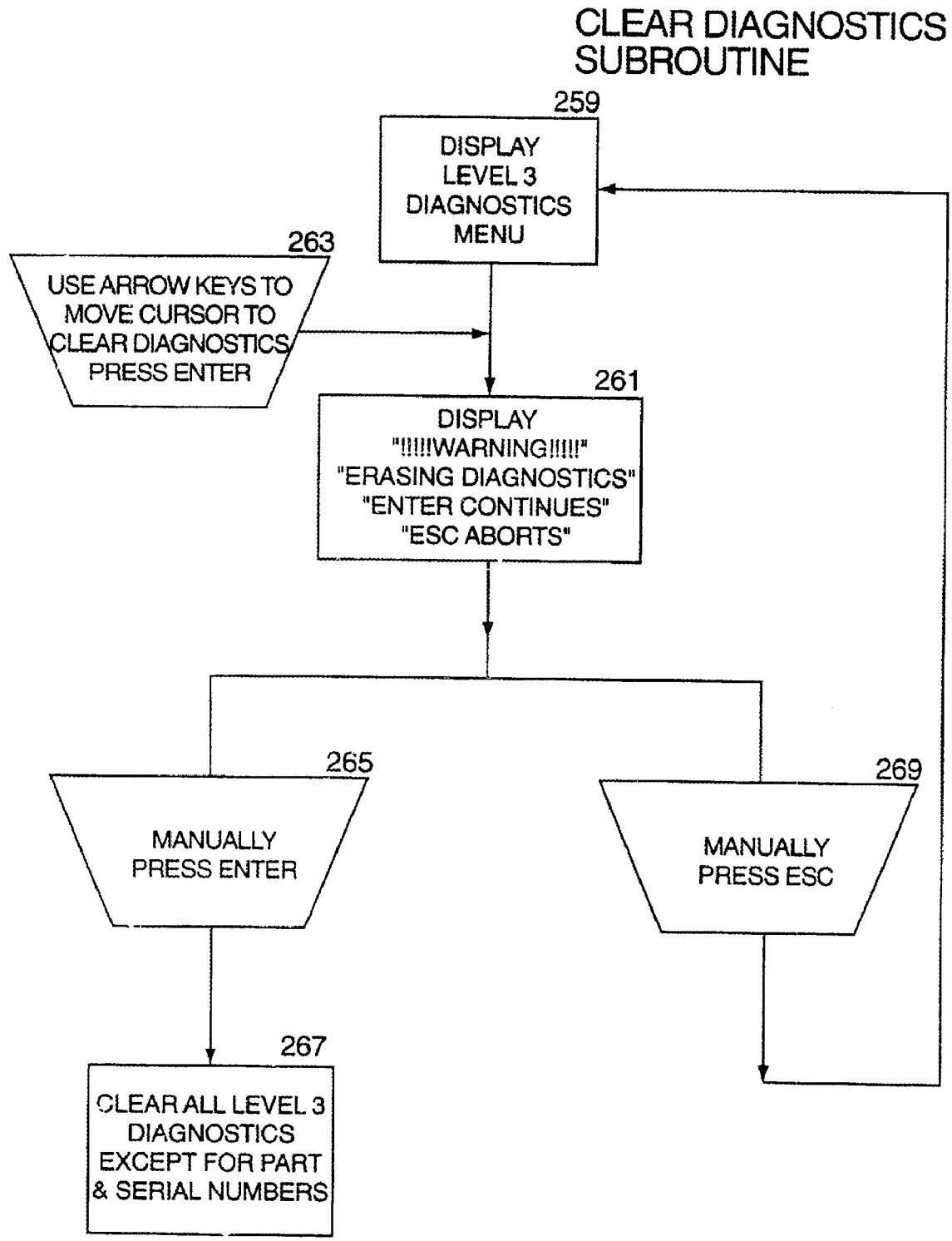

FIG. 10I—Clear Diagnostics

This menu item clears the memory locations storing the data displayed by items 1-8. If they are not cleared, new data overwrites old data as it occurs.

After the CLEAR DIAGNOSTICS MENU item has been selected in steps 259 and 263, a warning message is displayed in step 261, which prompts the user to either proceed with clearing the diagnostics or manually escape to avoid loss of data. In step 265, a second keystroke to the ENTER key moves the system to step 267 where all the diagnostics data is cleared from the system memory. Otherwise, the user can avoid erasing the diagnostic data by pressing the ESCAPE key in step 269.

Finally, menu items 9, 10 and 12, when accessed in the LEVEL 3 DIAGNOSTICS MENU, display the serial number of the diagnostic system, various part numbers and the password for the menu, respectively. In selecting the menu item for the password, the user can update or change the password for accessing this menu. Items 13-16 are discussed below in connection with FIGS. 12A and 12B.

Figure 11A:
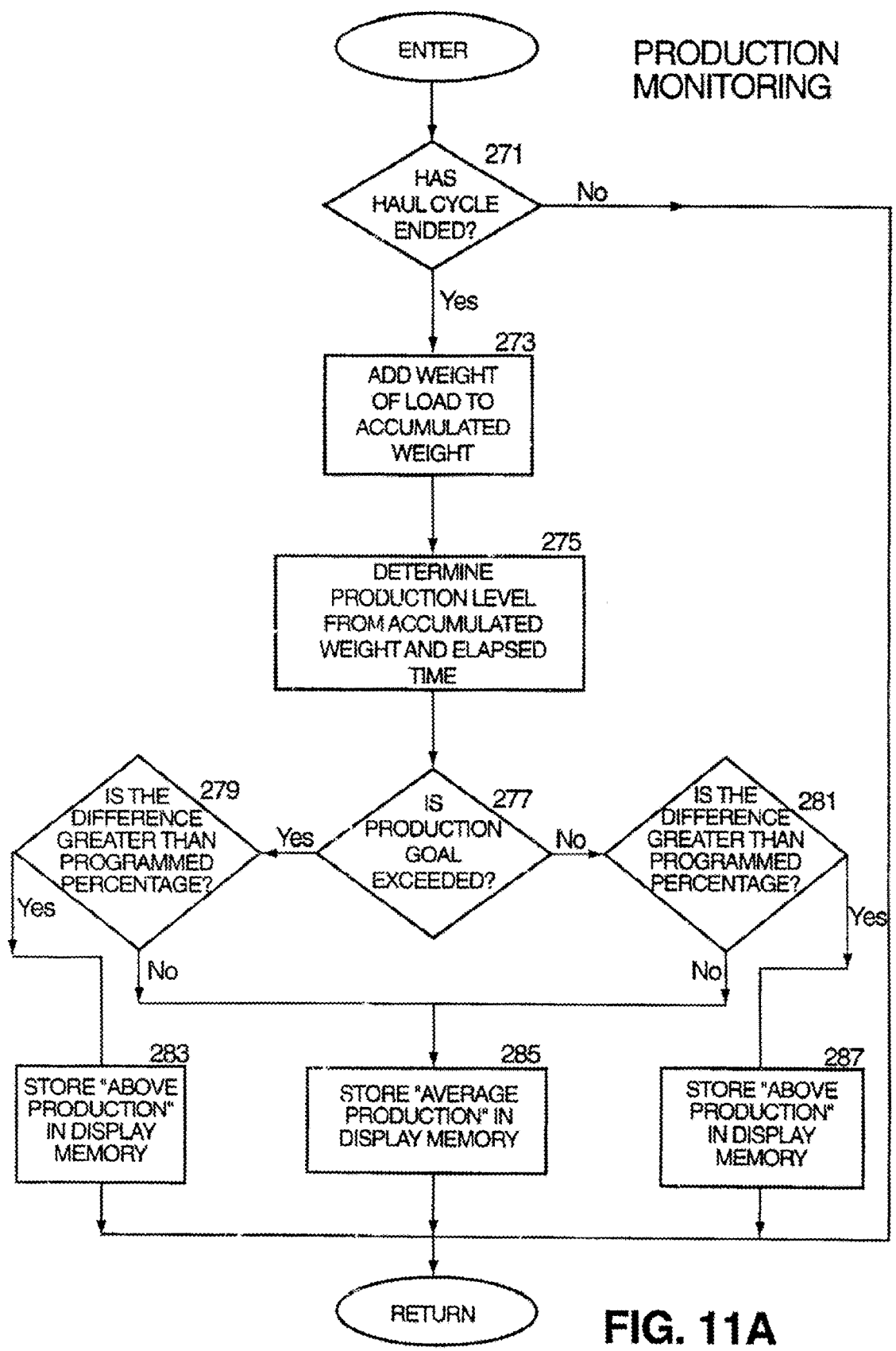
FIGS. 11A-11C are flow diagrams of diagnostic subroutines for diagnosing the production status of the vehicle on a real-time basis and displaying the status to the operator of the vehicle in accordance with one aspect of the invention.
Figure 11B:
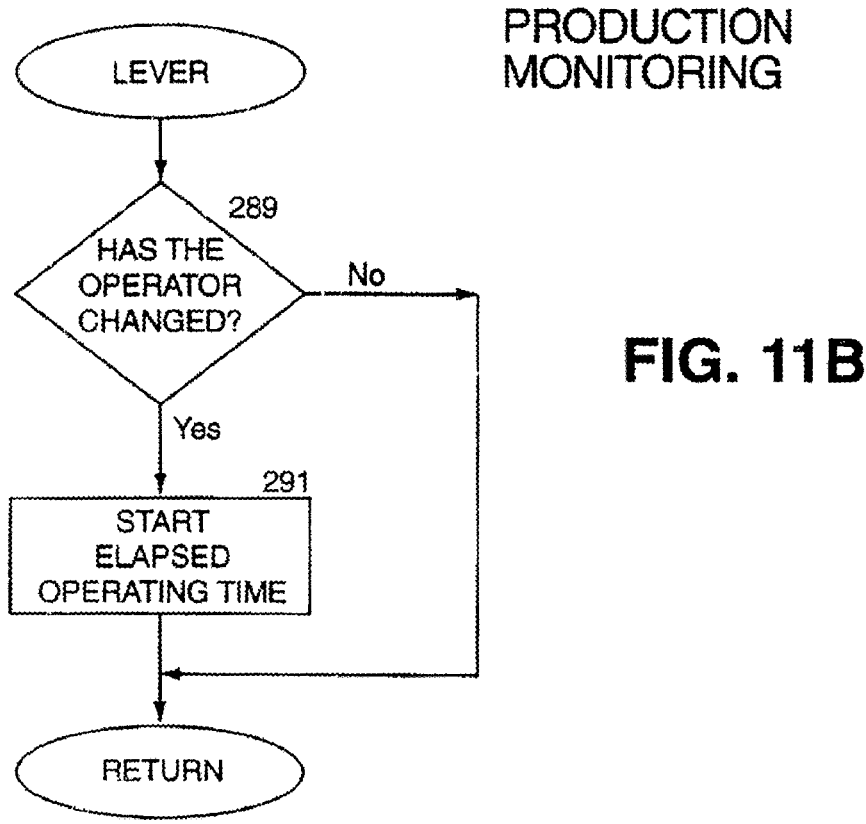
Figure 11C:
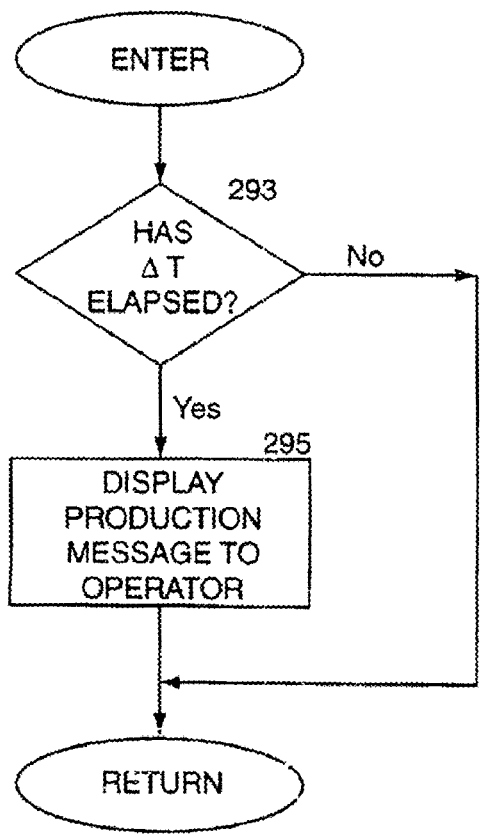

The production monitoring feature of the invention described previously in connection with FIGS. 2-4, is implemented by the computer program of Appendix A in accordance with the flow diagrams of FIGS. 11A-11C. Each time the vehicle 11 has completed a haul cycle (i.e., has dumped a load), the weight of the load is added to a running total weight of all loads hauled by the operator during his shift, which is also called the "elapsed operating time." In the flow diagram of FIG. 11A, the diagnostic system updates the accumulated total weight hauled by the vehicle 11 when a load has been dumped and re-calculates the rate of production for the vehicle and stores the results of a comparison between the calculated value and a production goal that has been programmed into the system by way of item 17 in the LEVEL 2 SETUP MENU (see FIG. 8). In FIG. 11B, the diagnostic system initializes the "elapsed operating time" when the operator changes. The normal operating screen of the display 61 is replaced by a production message at regular time intervals in FIG. 11C. The production message reads from the data stored in memory in the flow diagram of FIG. 11A whether the present production is "ABOVE PRODUCTION," "AVERAGE PRODUCTION" or "BELOW PRODUCTION."

In step 271 of the flow diagram of FIG. 11A, the computer program of Appendix A determines whether a haul cycle has ended. In making this determination, the processor 41 of FIG. 2 senses a change in the data from the dump sensor 67L, indicating that the body 13 of the vehicle 11 has been pivoted for the purpose of dumping a load. Alternatively, other sensor readings indicating a dump event can also be used to execute the decision in step 271. For example, the processor 41 may respond to a change in the data from the transducers of the pressure sensors 67K, which indicate that the body 13 has been lifted off the frame (see U.S. Pat. No. '835). The weight of the load that has just been dumped is determined by the processor 41 from the readings of the transducers as described in detail in the '835 patent.

In step 273, the weight of the load is added to a running total or accumulated weight of all the loads that have been dumped by the operator during the "elapsed operating time." With the new value for the accumulated weight determined in step 273, the diagnostic system of the invention moves to step 275 where a new rate of production is calculated from the updated accumulated weight and the value of the elapsed time, which is a relative time initiated by the flow diagram in FIG. 11B.

From step 275, the system moves to decision step 277 in order to compare the actual rate of production to a production goal. If the actual rate of production is greater than the production goal, the system moves to decision step 279. On the other hand, if the rate of production is less than the production goal, the system moves to step 281. In both steps 279 and 281, the system determines whether the percentage difference between the actual rate of production and the production goal is greater than a programmed percentage. The programmed percentage is a value that has been entered into the memory of the system by way of item 17 of the LEVEL 2 SETUP memory shown in FIG. 8. If the percentage difference is less than the programmed percentage, the message "AVERAGE PRODUCTION" is stored in a display area of the RAM memory 47 in step 285. If the percentage difference between the actual rate of production and the production goal is greater than the programmed percentage in step 281, the message sent to the display area of the RAM memory 47 is "BELOW PRODUCTION" as indicated in step 287. If the difference is determined to be greater than the programmed percentage in step 279, however, the system stores in step 283 the message "ABOVE PRODUCTION." After the display area of the RAM memory 47 has been updated in one of steps 283, 285 or 287, the system returns to performing other tasks until the end of the next haul cycle is sensed at step 271.

In the flow diagram of 11B, the system interrogates a memory location of the RAM 47 that records the identification of the vehicle operator in order to determine if the identification has changed. If the identification is different as determined by the system in step 289, a new operator has control of the vehicle 11 and in step 291, the "elapsed operating time" is reset. Also, the value of the accumulated weight is reset.

In FIG. 11C, step 293 determines if a time ΔT has elapsed since the last display of the production message on the screen of the display 61. If the time ΔT has elapsed as determined in step 293, the production message is delivered to the display 61 for a predetermined amount of time in step 295. From the perspective of the vehicle operator, the first line of the screen of the display 61 alternates between the normal operating screen previously described and the rate of production message with the duration of the production message and the time interval between consecutive displays of the message programmed as desired. The frequency of the production message, however, should be sufficient to keep the operator of the vehicle 11 advised as to the current status of the vehicle's rate of production with respect to the programmed goal. In this manner, if the vehicle 11 is below or above the programmed goal, the operator of the vehicle can take appropriate action in order to ensure the vehicle is operated efficiently and profitably without risking unnecessary wear or damage to it.

In keeping with the invention, the chronology memory 83 of FIG. 5A is updated and maintained by the processor 41 by reading the data from the work-related sensors 67 at regular intervals. In this illustrated embodiment of the invention, the processor 41 reads all the work-related sensors 67 at step 311 of the flow diagram of FIG. 12A four times a second. In step 313, the data read from sensors 67 are transferred by the processor 41 to the first memory cell 99 (see FIG. 5A) of the chronology memory 83. After the processor 41 has scanned all of the work-related sensors 67, the pointer 113 in FIG. 5B is incremented to a next storage location so that the next scan will read the new data from the work-related sensors into the location of the memory 99 presently containing the oldest data. As part of steps 311 and 313 in FIG. 12A, the processor 41 also reads data from one of the memory cells and writes it to another in accordance with the diagram and accompanying explanation of FIG. 5A. After the samples have been taken and the chronology memory 83 updated, the processor 41 returns to other tasks.

Figure 12A:
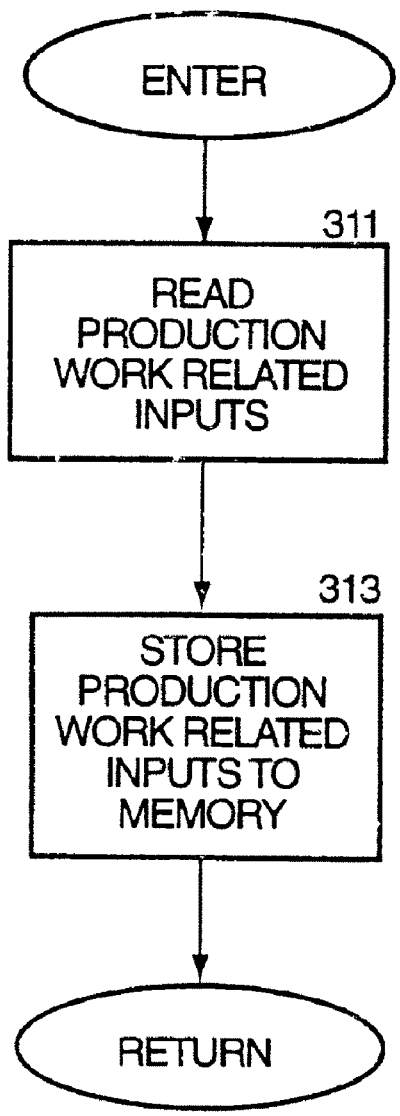
FIGS. 12A and 12B are flow diagrams of diagnostic subroutines for accumulating a historical data base of vital sign conditions and task indicia and identifying the data in the historical data base with detection of a failure mode of the vehicle in accordance with another aspect of the invention.
Figure 12B:
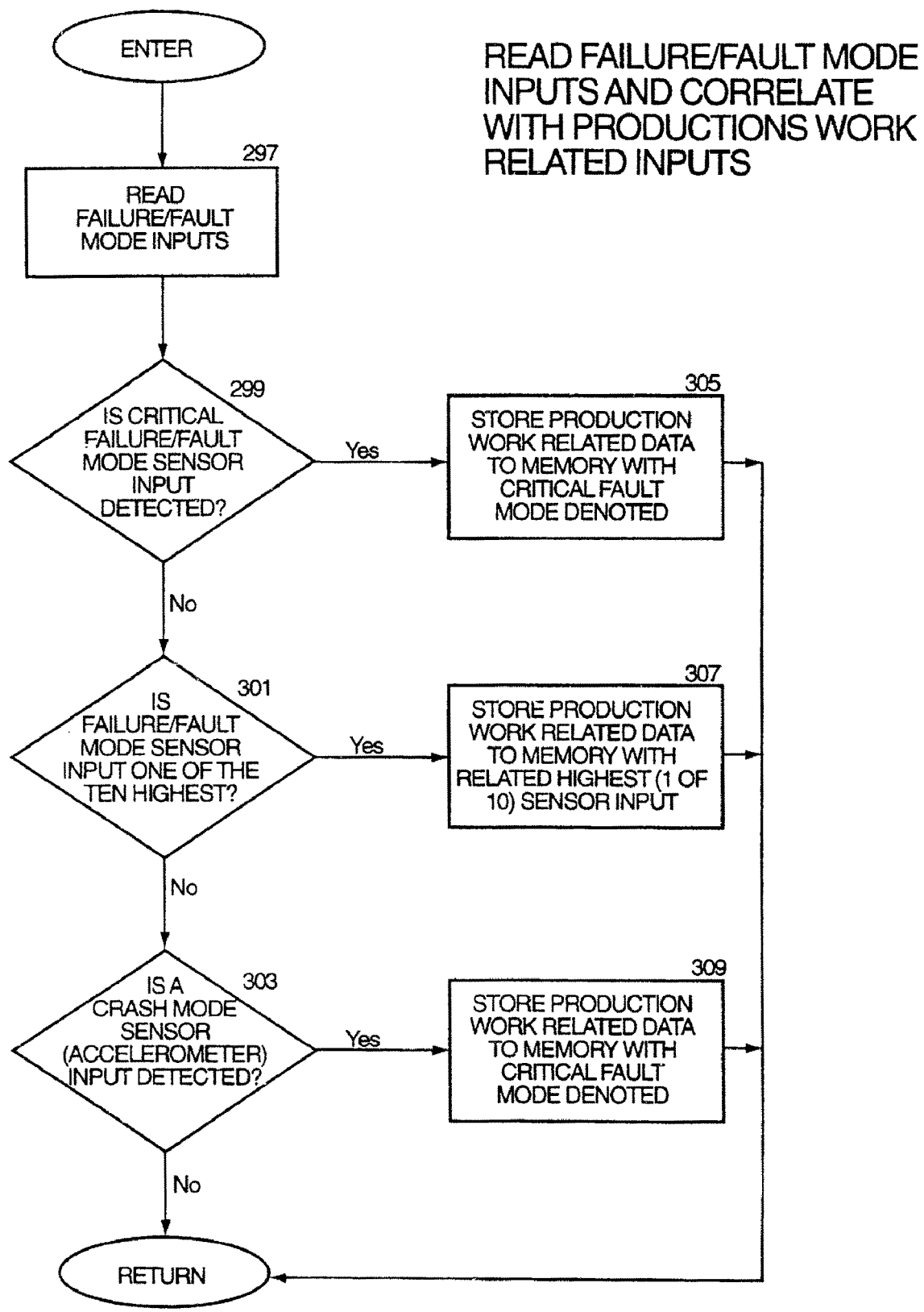

In FIG. 12B the processor 41 monitors the vital sign sensors 73 for anomalies in the value of their data and reports the anomalies by recording the anomaly in a memory location in association with a chronology of the work-related data leading up to anomaly. In step 297, the processor delivers each data sample from a vital sign sensor to a series of comparisons with pre-programmed data as set forth in steps 299, 301 and 303. If any of these comparisons indicates the value of the data to be an anomaly, the processor 41 stores the identity of the sensor 73, the anomalous value of the data and an appropriate chronology of the work-related data that immediately preceded the sampling of the vital sign data.

Specifically, in step 299 of FIG. 12B, the processor 41 determines whether the value of the data from the vital sign sensor 73 exceeds a pre-programmed critical value 116. If the sampled data exceeds the critical value 116, the identity of the sensor 73, the value of the data and a chronology of the work-related data is stored in the memory 89 at step 305. On the other hand, if the data does not exceed the pre-programmed critical value 116, the processor 41 goes to step 301 and determines if the value of the data sample is one of the historical ten most extreme readings. If it is one of the most ten most extreme readings, the processor 41 executes step 307, which stores the value of the data sample with the chronology of the work-related data in the memory 87. Finally, if the sampled data is neither exceeding a pre-programmed critical value nor one of the ten most extreme values for the vital sign sensor, step 303 determines whether the sampled data indicates a crash of the vehicle has occurred. In the illustrated embodiment, the system recognizes a crash when the value of the data sampled from the accelerometer 73L exceeds a pre-programmed critical value 116. If the processor determines at step 303 that a crash has occurred, it stores all of the data in the chronology memory 83 in a separate memory 85 and associates the chronology data with the sensor reading indicating a vehicle crash condition at step 309.

Finally, in connection with steps 299 and 303, the invention contemplates continuing to gather data and store the data to the memories 85 and 89 so long as the value of the vital sign parameter exceeds the critical value 116. For example, when the value of the accelerometer 73L exceeds its critical value 116, the processor 41 begins to transfer data from the chronology memory 83 to the memory 85. The processor 41 continues to update the memory 83 and transfer the updated data to the memory 85 for as long as the data from the accelerometer exceeds a threshold value. The threshold value may be less than the critical value 116. In the example of the accelerometer 73L, the threshold level may be a zero value since all data that is collected during a crash may be useful in diagnosing the cause. Thus, data would continue to be transferred to the memory 85 until the vehicle cam to a standstill (i.e., the data from the accelerometer 73L goes to zero).

All of the references including patents, patent applications and literature cited herein are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

I claim:

1. A method for recording operation of a vehicle, the method comprising:
    monitoring production-related parameters of the vehicle, including a ground speed of the vehicle, a position of a throttle for an engine of the vehicle and a degree of braking of the vehicle;
    monitoring vital sign parameters of the vehicle, including information indicative of a change in the velocity of the vehicle;
    detecting a collision of the vehicle in response to a sudden change in the velocity of the vehicle;
    automatically sending a wireless distress signal from the vehicle in response to detecting the collision; and
    capturing the production-related parameters of the vehicle before detection of the collision and the vital sign parameters after detection of the collision.

2. The method of claim 1 wherein the production-related parameters include an RPM of the engine.

3. The method of claim 1 wherein the production-related parameters include actions of a steering wheel.

4. The method of claim 1 wherein the production-related parameters include a load on the engine.

5. The method of claim 1 wherein the vital sign parameters include an acceleration of the vehicle.

6. The method of claim 1 wherein the production-related parameters include an on/off status of a braking system of the vehicle.

7. The method of claim 1 wherein the production-related parameters include a status of a seat belt.

8. The method of claim 1 wherein the information indicative of the change in velocity is a sequence of speed measurements taken at known time intervals.

9. An apparatus for recording operation of a vehicle, the apparatus comprising:
    sensors for monitoring production-related parameters of the vehicle, where the parameters include ground speed of the vehicle, a position of a throttle for an engine of the vehicle and a degree of braking by a braking system of the vehicle;
    a first memory for capturing information from one or more of the sensors for monitoring production-related parameters;
    a second memory for receiving the information from the first memory;
    sensors for monitoring vital signs of the vehicle, where the vital signs include a collision of the vehicle;
    a processor in communication with the production-related and vital sign sensors and the first and second memories for transferring into the second memory the information captured by the first memory in response to detection of the collision of the vehicle, where the information includes data from one or more of the production-related parameters before detection of the collision and data from one or more of the vital signs sensors after detection of the collision; and
    a transmitter for automatically transmitting a distress signal in response to detection of the collision of the vehicle.

10. The apparatus of claim 9 wherein the second memory is a permanent memory.

11. The apparatus of claim 9 wherein one of the vital signs sensors is an accelerometer.

12. The apparatus of claim 9 wherein the information indicates a change in the speed of the vehicle both before and after detection of the collision.

13. The apparatus of claim 9 wherein the sensors for monitoring production-related parameters includes a sensor for detecting an on/off status of the braking system.

14. The apparatus of claim 9 wherein the information includes one or more positions of the throttle leading up to the detection of the collision.

15. The apparatus of claim 9 wherein the information includes the degree of braking leading up to the detection of the collision.

16. The apparatus of claim 15 wherein the information includes one or more positions of the throttle leading up to detection of the collision.

17. The apparatus of claim 9 wherein the sensors for monitoring production-related parameters of the vehicle include a sensor for determining a state of a seat belt in the vehicle.

18. A method for recording operation of a vehicle, the method comprising:
    monitoring production-related parameters of the vehicle, including a ground speed of the vehicle, a position of a throttle for an engine of the vehicle and an on/off status of a braking system of the vehicle;
    monitoring vital sign parameters of the vehicle, including information indicative of a change in the velocity of the vehicle;
    detecting a collision of the vehicle in response to a sudden change in the velocity of the vehicle;

automatically sending a wireless distress signal from the vehicle in response to detecting the collision; and capturing the production-related parameters of the vehicle before detection of the collision and the vital sign parameters after detection of the collision.

19. The method of claim 18 wherein the production-related parameters include an RPM of the engine.

20. The method of claim 18 wherein the production-related parameters include actions of a steering wheel.

21. The method of claim 18 wherein the production-related parameters include a load on the engine.

22. The method of claim 18 wherein the vital sign parameters includes an acceleration of the vehicle.

23. The method of claim 18 wherein the production-related parameters include a degree of braking of the braking system of the vehicle.

24. The method of claim 18 wherein the production-related parameters include a status of a seat belt.

25. The method of claim 18 wherein the information indicative of the change in velocity is a sequence of speed measurements taken at known time intervals.

26. An apparatus for recording operation of a vehicle, the apparatus comprising:

sensors for monitoring production-related parameters of the vehicle, where the parameters include ground speed of the vehicle, a position of a throttle for an engine of the vehicle and an on/off status of a braking system of the vehicle;

a first memory for capturing information from one or more of the sensors for monitoring production-related parameters;

a second memory for receiving the information from the first memory;

sensors for monitoring vital signs of the vehicle, where the vital signs include a collision of the vehicle;

a processor in communication with the production-related and vital sign sensors and the first and second memories for transferring into the second memory the information captured by the first memory in response to detection of the collision of the vehicle, where the information includes data from one or more of the production-related parameters before detection of the collision and data from one or more of the vital signs sensors after detection of the collision; and a transmitter for automatically transmitting a distress signal in response to detection of the collision of the vehicle.

27. The apparatus of claim 26 wherein the second memory is a permanent memory.

28. The apparatus of claim 26 wherein one of the vital signs sensors is an accelerometer.

29. The apparatus of claim 26 wherein the information indicates a change in the speed of the vehicle both before and after detection of the collision.

30. The apparatus of claim 26 wherein the sensors for monitoring production-related parameters includes a sensor for detecting a degree of braking of the braking system.

31. The apparatus of claim 26 wherein the information includes one or more positions of the throttle leading up to the detection of the collision.

32. The apparatus of claim 26 wherein the information includes the on/off status of the braking system leading up to the detection of the collision.

33. The apparatus of claim 32 wherein the information includes one or more positions of the throttle leading up to detection of the collision.

34. The apparatus of claim 26 wherein the sensors for monitoring production-related parameters of the vehicle include a sensor for determining a state of a seat belt in the vehicle.

35. A method for recording operation of a vehicle, the method comprising:

monitoring positions of a throttle for an engine for the vehicle and a load carried by the vehicle;

detecting a collision of the vehicle; and recording one or more positions of the throttle and a condition of the load preceding the detection of the collision.

36. The method of claim 35 including monitoring a status of a braking system of the vehicle and recording the status in response to detection of the collision.

37. The method of claim 35 including monitoring a status of a seat belt and recording the status in response to detection of the collision.

38. The method of claim 35 including monitoring a ground speed of the vehicle and recording the ground speed in response to detection of the collision.

* * * * *